US012630154B2

(12) United States Patent
Hagvall et al.

(10) Patent No.: US 12,630,154 B2
(45) Date of Patent: May 19, 2026

(54) METHOD FOR HANDLING OPERATIONAL REQUIREMENTS WHEN DRIVING BETWEEN TWO AREAS

(71) Applicant: Volvo Autonomous Solutions AB, Gothenburg (SE)

(72) Inventors: Linus Hagvall, Gothenburg (SE); Stefan Bergquist, Gothenburg (SE); Petter Wirfält, Hindås (SE); Fredrik Sandblom, Mölndal (SE); Ian Macisaac, Härryda (SE); Robert Hult, Torslanda (SE); Marcus Kreku, Trier (DE)

(73) Assignee: Volvo Autonomous Solutions AB, Gothenburg (SE)

( * ) Notice: Subject to any disclaimer, the term of this patent is extended or adjusted under 35 U.S.C. 154(b) by 51 days.

(21) Appl. No.: 18/854,777

(22) PCT Filed: Apr. 4, 2023

(86) PCT No.: PCT/EP2023/058863
§ 371 (c)(1),
(2) Date: Oct. 7, 2024

(87) PCT Pub. No.: WO2023/194391
PCT Pub. Date: Oct. 12, 2023

(65) Prior Publication Data
US 2025/0249894 A1      Aug. 7, 2025

(30) Foreign Application Priority Data

Apr. 7, 2022      (WO) ................. PCT/EP2022/059210

(51) Int. Cl.
*B25J 19/02*          (2006.01)
*B60W 30/09*          (2012.01)
(Continued)

(52) U.S. Cl.
CPC ........ *B60W 30/09* (2013.01); *B60W 30/0956* (2013.01); *B60W 50/0097* (2013.01);
(Continued)

(58) Field of Classification Search
CPC ............. B60W 30/09; B60W 30/0956; B60W 60/0015; B60W 50/0097; B60W 2520/14; B60W 2540/18; G08G 1/166
See application file for complete search history.

(56) References Cited

U.S. PATENT DOCUMENTS 9,174,830 B1 * 11/2015 Bell ..................... G05D 1/0246
9,828,092 B1 * 11/2017 Navot ................... B64U 10/14
(Continued)

FOREIGN PATENT DOCUMENTS

EP          3617828 A1      3/2020

OTHER PUBLICATIONS

International Search Report and Written Opinion of the International Searching Authority in corresponding International Application No. PCT/EP2023/058863 mailed Jun. 20, 2023 (9 pages).
(Continued)

*Primary Examiner* — Dalena Tran
(74) *Attorney, Agent, or Firm* — Jeffri A. Kaminski; Venable LLP

(57) ABSTRACT

A method for handling operational for an autonomous vehicle driving from a first work area to a second work area via a predefined path is provided. The operations of the autonomous vehicle are constrained by the operational requirements. The method comprises detecting that the autonomous vehicle is initiating driving in the predefined path. The method further comprises when detected that the autonomous vehicle is initiating driving in the predefined path, triggering a relaxation of the operational requirements. The method further comprises, when the autonomous (Continued)

vehicle is driving in the predefined path, detecting whether the autonomous vehicle turns towards the first work area. When detecting that the autonomous vehicle turns towards the first work area, the method further comprises triggering a preventive action for preventing the autonomous vehicle from driving towards the first work area using the relaxed operational requirements.

35 Claims, 10 Drawing Sheets

(51) Int. Cl.

| | | |
|---|---|---|
| *B60W 30/095* | (2012.01) | |
| *B60W 50/00* | (2006.01) | |
| *B60W 60/00* | (2020.01) | |

(52) U.S. Cl.

CPC ... *B60W 60/0015* (2020.02); *B60W 2300/125* (2013.01); *B60W 2520/10* (2013.01); *B60W 2520/125* (2013.01); *B60W 2520/14* (2013.01); *B60W 2540/18* (2013.01); *B60W 2556/10* (2020.02); *B60W 2556/45* (2020.02)

(56) References Cited

U.S. PATENT DOCUMENTS

| | | | |
|---|---|---|---|
| 2009/0079555 A1* | 3/2009 | Aguirre De Carcer ..................... G07C 5/008 701/2 |
| 2009/0322549 A1* | 12/2009 | Schleifer ............ G05B 19/4061 340/1.1 |
| 2019/0265722 A1* | 8/2019 | Haeusler .............. G05D 1/0251 |
| 2020/0039353 A1 | 2/2020 | Chandrasekar |

OTHER PUBLICATIONS

International Preliminary Report on Patentability in corresponding International Application No. PCT/EP2023/058863 mailed Mar. 7, 2024 (6 pages).

* cited by examiner

METHOD FOR HANDLING OPERATIONAL REQUIREMENTS WHEN DRIVING BETWEEN TWO AREAS

CROSS-REFERENCE TO RELATED APPLICATIONS

This application is a U.S. National Stage application of PCT/EP2023/058863, filed Apr. 4, 2023 and published on Oct. 12, 2023 as WO/2023/194391, which claims the benefit of International Patent Application No. PCT/EP2022/059210, filed Apr. 7, 2022, all of which are hereby incorporated by reference in their entireties.

TECHNICAL FIELD

The invention relates to a control unit and a method for handling operational requirements when driving between areas. The invention further relates to an autonomous vehicle, a computer program, and a computer program product.

The invention can be applied in heavy-duty vehicles, such as trucks, buses and construction equipment. Although the invention will be described with respect to an autonomous vehicle, the invention is also applicable to semi-autonomous vehicles.

BACKGROUND

Autonomous vehicles navigate work areas using localization services for finding their respective positions. Guaranteeing a high integrity for localization when navigating autonomous vehicles is one of the most important problems to solve for automating complex work areas. Typically, to navigate these work areas, autonomous vehicles need to depend on perception systems and/or sensors. To ensure safety, it is often necessary to provide a formal and/or extensive proof of that the autonomous vehicle does not drive in critical areas which may cause danger to manual actors. These types of proofs often involve extensive high-quality testing which is both time consuming and costly to a degree that makes it infeasible. During the tests, a localization solution needs to be verified against ground truth data with very high robustness and accuracy. However, the amount of data may be too vast, and/or the type of data may simply not be available.

A localization system typically estimates an autonomous vehicle's position inside a recorded map, e.g. by map matching techniques. The localization system tries to recognize features around itself and matches those features with the map. Most perception tasks suffer from problems with providing accurate confidence values for position estimation. A particular problem when using map matching techniques is that faults that occur tend to be biased towards previously estimated values regardless of whether it was a correct or wrong estimation. Hence, if the bias is towards a correct value, it is likely an acceptable value. However, if the bias is towards a previously estimated wrong value, it will be difficult to detect increasing inaccuracies.

It is however difficult to detect faults in a localization system since there may be no other data than what is supplied by the localization system to compare with. For some scenarios, it may be possible to perform simpler consistency checks with a perception system, e.g. by checking that the autonomous vehicle does not move a lot faster than what should be possible, e.g. 100 meters (m) in 1 second (sec). These types of checks can however only detect certain types of extreme and/or obvious faults.

Ensuring safety for autonomous vehicles puts a requirement of high integrity and extremely low frequency of errors. As is exemplified above, it is difficult to estimate the vehicle's current position and pose in an accurate enough manner. Therefore, when driving in work areas, a vehicle motion may need to be constrained by various operational requirements. These operational requirements may limit the speed of the autonomous vehicles. Due to these operational requirements, the autonomous vehicle loses productivity as it cannot operate optimally, e.g. at its highest speed. Thus, a problem arises in how to improve productivity while ensuring safety of manual actors and other vehicles.

SUMMARY

An object of the invention is to improve the productivity of autonomous vehicles.

According to a first aspect, the above object is achieved by a method according to claim 1. Hence, there is provided a method for handling operational requirements for an autonomous vehicle driving from a first work area to a second work area via a predefined path. The operations of the autonomous vehicle are constrained by the operational requirements. The method comprises:

- detecting that the autonomous vehicle is initiating driving in the predefined path,
- when detected that the autonomous vehicle is initiating driving in the predefined path, triggering a relaxation of the operational requirements,
- when the autonomous vehicle is driving in the predefined path, detecting whether the autonomous vehicle turns towards the first work area,
- when detecting that the autonomous vehicle turns towards the first work area, triggering a preventive action for preventing the autonomous vehicle from driving towards the first work area using the relaxed operational requirements.

When it is detected that the autonomous vehicle is initiating driving in the predefined path, the relaxation of the operational requirements is triggered. In this way, improved productivity is achieved as the autonomous vehicle is less constrained in the predefined path, while still adhering to safety and security protocols. The first work area may have a manual actor, and thus to maintain safety of the manual actor, the autonomous vehicle needs to be restricted from driving in the first work area with the relaxed operational requirements. As an example, the autonomous vehicle may have been loaded by a manual actor in the first work area, and when the autonomous vehicle is loaded it should only be allowed to drive away from the manual actor and the first work area if operating under the relaxed operational requirements. To ensure that the autonomous vehicle does not drive in the first work area with the relaxed operational requirements, the preventive action is triggered when it is detected that the autonomous vehicle turns around towards the first work area. In other words, productivity of the autonomous vehicle is increased due to allowing the relaxed operational requirements, while still maintaining safety in the first work area by triggering the preventive action when detecting that the autonomous vehicle turns around towards the first work area.

The method may further comprise maintaining the relaxed operational requirements until detecting that the autonomous vehicle turns towards the first work area. In other words, the productivity of the autonomous vehicle can continue to be high, e.g., as long as the vehicle does not endanger the first work area where manual actors may be present by turning towards the first work area.

Optionally, maintaining the relaxed operational requirements until detecting that the autonomous vehicle turns towards the first work area comprises maintaining the relaxed operational requirements until detecting that the autonomous vehicle turns towards the first work area while the autonomous vehicle is loaded. In other words, in some scenarios, when the autonomous vehicle is unloaded, it may be safe for the autonomous vehicle to drive in or towards the first work area with the relaxed operational requirements. This is since the autonomous vehicle may only be endangering other vehicles when it is loaded, e.g., since the weight of the autonomous vehicle causes the autonomous vehicle to have longer brake distances and/or that a collision with the loaded autonomous vehicle is of higher severity due to increased impact in case of a collision. This allows the autonomous vehicle to operate areas in a cyclic manner, e.g., by first loading the autonomous vehicle at the first work area, and then allowing the autonomous vehicle to travel on the predefined path with relaxed operational requirements, and to unload at the second work area using the relaxed operational requirements, and when being unloaded the autonomous vehicle may further travel to the first work area using the predefined path, or an alternative path, while still using the relaxed operational requirements. In other words, safety is maintained in the first and second work areas, while productivity of the autonomous vehicle is improved. The second work area may in these embodiments be suitable for the autonomous vehicle to travel in using the relaxed operational requirements as it may only be an area for offloading only used by autonomous vehicles without manual actors present.

The method may further comprise measuring a distance and/or time driven in the predefined path, and when the measured distance and/or time driven in the predefined path fulfil at least one predetermined condition, triggering an increase of the operational requirements. In some of these embodiments, the second work area may be unsuitable for the autonomous vehicle to drive in using the relaxed operational requirements. To ensure that the autonomous vehicle does not drive in the second work area with the relaxed operational requirements, the operational requirements are increased, e.g. back to a default operational requirement configuration, when the measured distance and/or time driven in the predefined path fulfil the at least one predetermined condition, e.g., when it is deduced based on the measured time and/or distance that the autonomous vehicle is close to the second work area.

Optionally, detecting whether the autonomous vehicle turns towards the first work area comprises estimating a risk that the autonomous vehicle has turned towards the first work area, and detecting that the autonomous vehicle has turned towards the first work area when the risk exceeds a threshold. In this way, the autonomous vehicle may be prevented from operating in the first work area, e.g., when loaded, using the relaxed operational requirements, in scenarios where it is difficult to properly measure whether the autonomous vehicle has turned around or not. In this way, it is possible to err on the side of caution, and if any uncertainty indicates that it may be possible that the autonomous vehicle has turned enough to turn towards the first work area, then it may be assumed that the autonomous vehicle has turned towards the first work area.

Optionally, detecting whether the autonomous vehicle turns towards the first work area comprises obtaining an angular change in orientation of the autonomous vehicle over a distance window defining a distance travelled by the autonomous vehicle, and detecting that the autonomous vehicle turns towards the first work area when the angular change in orientation exceeds a threshold. In this way, improved productivity of the autonomous vehicle is achieved. This is since it may be possible to accurately detect when the autonomous vehicle has turned towards the first work area by use of the angular change in orientation over the distance window. If the angular change exceeds the threshold, it may be assumed that the autonomous vehicle has turned towards the first work area and the autonomous vehicle may thereby no longer be allowed to operate using the relaxed operational requirements. Since the distance window is used, the autonomous vehicle only needs to obtain the angular change over the distance window, reducing burden of keeping track of all angular change in orientation for all travel of the autonomous vehicle. Furthermore, as only the distance window is considered, it is possible to detect short term U-turns inside the distance window as that the vehicle is turning around towards the first work area, but still allow for the predefined path to have a turning shape, e.g., which may turn up to 180 degrees over a distance which is longer than the distance window. This allows for detecting whether the autonomous vehicle turns around towards the first work area while still allowing for the predefined path to be of any suitable shape or form.

Optionally, the method further comprises establishing the angular change in orientation of the autonomous vehicle over the distance window by estimating a change in yaw angle and a change in distance travelled by the autonomous vehicle.

Optionally, estimating the change in yaw angle and change in distance travelled by the autonomous vehicle is performed periodically when the autonomous vehicle is travelling in the predefined path. For example, the estimation of the change in yaw angle and change in distance travelled by the autonomous vehicle may be performed based on a predefined time period.

Optionally, the angular change in orientation of the autonomous vehicle over the distance window is a cumulative sum of a plurality of yaw angles measured or estimated by the autonomous vehicle over the distance travelled by the autonomous vehicle. In this way, it is possible to detect when the autonomous vehicle can possibly have turned around towards the first work area by evaluating whether or not the cumulative sum of the plurality of yaw angles is above a threshold, e.g., 180 degrees.

Optionally the distance window is a distance of a set length, which distance is the most recent distance travelled by the autonomous vehicle in the predefined path. In other words, the distance window may be the most recent distance, of the set length, travelled by the autonomous vehicle.

Optionally, the set length of the distance window is limited by a minimal turning radius of the autonomous vehicle. This means that the distance window is large enough to detect the autonomous vehicle turning around at a tight angle. Additionally or alternatively, the set length of the distance window is limited by a size, e.g., width, of the predefined path and/or the first work area.

Optionally, obtaining the angular change in orientation of the autonomous vehicle over the distance window comprises obtaining an uncertainty of the obtained angular change in orientation of the autonomous vehicle, and wherein detecting that the autonomous vehicle turns towards the first work area is further based on the obtained uncertainty. For example, the angular change in orientation may be adjusted for the uncertainty when compared with a threshold. This means that if there is a risk that the autonomous vehicle has turned around in the distance of the distance window when accounting for the uncertainty, the method may detect that the autonomous vehicle has turned around towards the first work area, and a preventive action may need to be triggered.

Optionally, detecting that the autonomous vehicle is initiating driving in the predefined path comprises determining that the autonomous vehicle is positioned in the first work area and that a driving direction of the vehicle is directed along the predefined path.

Optionally, detecting that the autonomous vehicle is initiating driving in the predefined path comprises detecting that the autonomous vehicle is loaded, e.g. fully loaded or loaded above a predefined weight and/or volume. By "loaded" is herein intended that the vehicle is carrying weight, such as goods, objects, or materials, e.g., raw materials such as stones, ores, metals, etc.

Optionally, detecting that the autonomous vehicle is initiating driving in the predefined path comprises receiving a signal indicating that the autonomous vehicle is initiating driving in the predefined path. The signal may be triggered based on detecting that the autonomous vehicle is loaded, e.g. fully loaded, and/or when there is a forward motion of the autonomous vehicle.

Optionally, the signal is received from a wireless device or stationary control device in the first work area, which wireless device or stationary control device is operated by a user in the first work area or wherein the signal is derived from obtained measurements related to an operational status of the autonomous vehicle. In other words, the user may first inspect the autonomous vehicle and decide that it is time to initiate driving in the predefined path towards the second work area, and trigger the signal and/or trigger the autonomous vehicle to start driving in the predefined path. Alternatively, the measurements related to the operational status of the autonomous vehicle may indicate that the autonomous vehicle is initiating driving in the predefined path, e.g., when brakes of the autonomous vehicle have been released, and/or when an acceleration of the autonomous vehicle exceed a threshold value and/or when wheels of the autonomous vehicle is detected to rotate.

Optionally, the operational requirements comprise one or more safety constraints imposed on operations of the autonomous vehicle for hindering a collision between the autonomous vehicle and manual actors. Increasing the operational requirements may hence comprise . . . and relaxing the operational requirements may comprise . . . .

Optionally, triggering the relaxation of the operational requirements comprises any one or more out of:

increasing a maximum speed limit of the autonomous vehicle, adjusting one or more sensors and/or subsystems of the autonomous vehicle.

Optionally, adjusting the one or more sensors and/or subsystems comprises any one or more out of:

adjusting or switching a brake system of the autonomous vehicle, and disabling an obstacle detection system of the autonomous vehicle.

Optionally, detecting whether the autonomous vehicle turns towards the first work area comprises:

estimating a turning radius of the autonomous vehicle, and comparing the estimated turning radius with a predefined width of the predefined path.

The estimated turning radius may also be predicted and/or measured. When the turning radius indicates that the autonomous vehicle will be able to turn around within the width of the predefined path, the preventive action may be triggered.

Optionally, the autonomous vehicle is detected to turn towards the first work area when $2R-K \leq W$, wherein R is the estimated turning radius of the autonomous vehicle, K is a preconfigured margin constant, and wherein W is the predefined width of the predefined path. In other words, when the turning radius times two, i.e. a turning diameter, is smaller than the predefined width of the predefined path, the preventive action must be triggered as the autonomous vehicle may otherwise turn towards and drive towards the first work area with the relaxed operational requirements.

Optionally, detecting whether the autonomous vehicle turns towards the first work area comprises:

estimating an average turning radius of the autonomous vehicle for a predetermined past time period, and comparing the estimated turning radius with a predetermined maximum allowed average turning radius for the predetermined past time period.

Optionally, detecting whether the autonomous vehicle turns towards the first work area comprises:

measuring an aggregated turning angle of the autonomous vehicle, wherein the aggregated turning angle indicates a total angle turned by the autonomous vehicle when driving in the predefined path, and comparing the aggregated turning angle with a predetermined maximum allowed steering wheel angle of the autonomous vehicle.

The aggregated turning angle may comprise a total angle turned in either or both directions. As the predefined path may have predefined curvatures, the predetermined maximum allowed steering wheel angle may be calculated in advance, and if exceeding this maximum allowed steering wheel angle, it is detected that the autonomous vehicle may turn around towards the first work area, and thereby it is needed to trigger the preventive action.

Optionally, estimating the turning radius and/or measuring the aggregated turning angle comprises determining a turning path for the autonomous vehicle.

Optionally, estimating the turning radius and/or measuring the aggregated turning angle comprises, based on a current vehicle speed and/or a wheel speed profile, determining one or more turning parameters for a predetermined future time period. The wheel speed profile may be an average speed of the vehicle or a wheel of the vehicle for a set period of time.

Optionally, the turning parameters comprise any one or more out of: a yaw rate, a steering wheel angle, and a lateral acceleration of the autonomous vehicle. Any of these parameters, independently or in any suitable combination, may be used to measure how the autonomous vehicle is turning, and/or predict how the autonomous vehicle will turn.

Optionally, triggering the preventive action comprises any one or more out of:

triggering an increase of the operational requirements, triggering an emergency stop, triggering a handover to a remote control drive mode, triggering an alert, and triggering an adjustment and/or limitation of a turning angle of the autonomous vehicle.

Optionally, the at least one predetermined condition is fulfilled when the measured distance is above a predefined distance threshold.

Optionally, the at least one predetermined condition is fulfilled when the measured time multiplied with a predetermined max speed of the predefined path is above the predefined distance threshold.

Optionally, triggering the increase of the operational requirements comprises resetting the operational requirements, e.g. back to a default operational requirement configuration.

Optionally, triggering the increase of the operational requirements comprises any one or more out:

decreasing a maximum speed limit of the autonomous vehicle, adjusting one or more sensors and/or subsystems of the autonomous vehicle.

According to a second aspect, there is provided a control unit to perform the method according to the first aspect. The control unit may be an electronic control unit.

According to a third aspect, there is provided an autonomous vehicle comprising the control unit according to the second aspect. The autonomous vehicle is configured to drive from a first work area to a second work area via a predefined path.

Optionally, the autonomous vehicle is further configured with a predetermined maximum allowed steering wheel angle. In this way, the autonomous vehicle may be restricted to only be able to turn a predefined angle, and in this way, the autonomous vehicle is at least partly restricted in its ability to turn around within the predefined path.

According to a fourth aspect, there is provided a computer program comprising program code means for performing the method according to the first aspect, when said program is run on a computer.

According to a fifth aspect, there is provided a computer program medium carrying a computer program comprising program code means for performing the method according to the first aspect, when said program is run on a computer.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
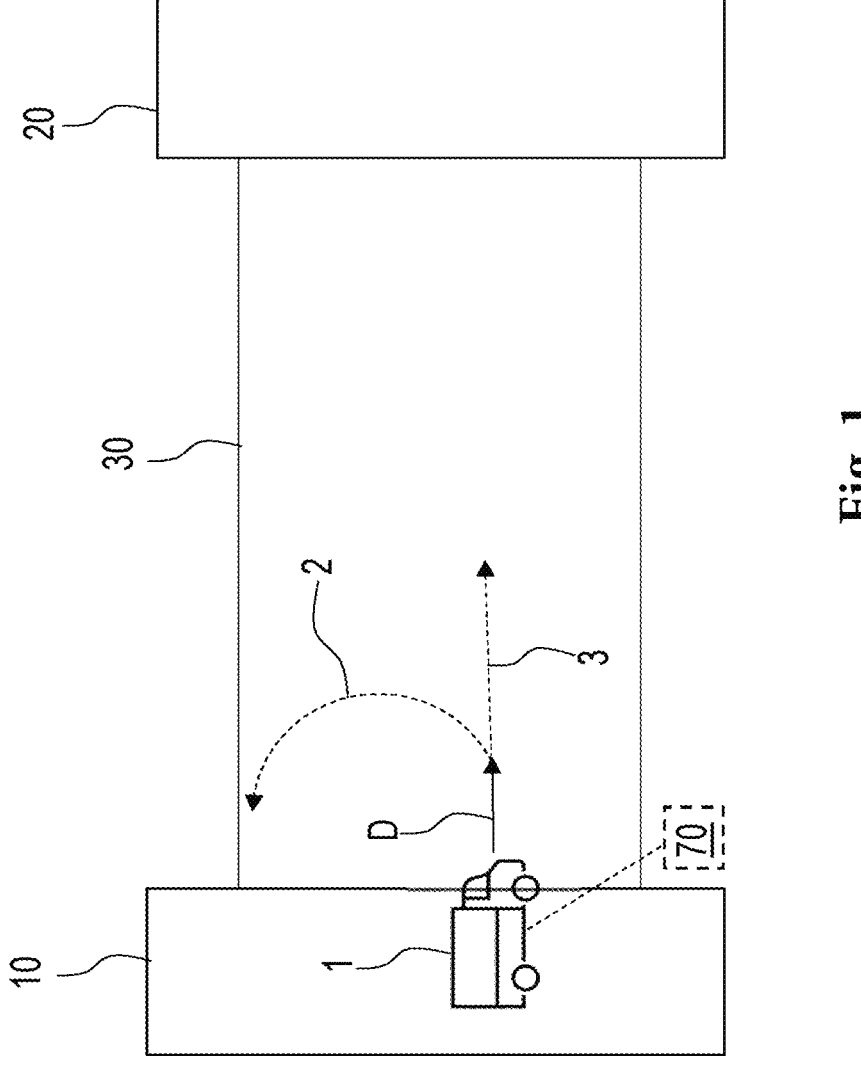
FIG. 1 is a schematic overview of an autonomous vehicle, two work areas and a predefined path.

FIG. 1. is a schematic overview of an autonomous vehicle 1 in accordance with embodiments herein. The autonomous vehicle 1 may be any autonomous or semi-autonomous vehicle, e.g. a car, truck, bus, heavy-duty vehicle, wheel loader, etc. The autonomous vehicle 1 is arranged to travel from a first work area 10 to a second work area 20 via a predefined path 30. Typically, the autonomous vehicle 1 may be configured to transport objects, goods and/or materials between the first work area 10 and the second work area 20. The first work area 10 and the second work area 20 may e.g. be part of the same warehouse or in different warehouses, confined area, a quarry, open-pit mine, or any other suitable areas where it may be needed to use autonomous vehicles for transporting objects, goods and/or materials. The first work area 10 and the second work area 20 are connected by the predefined path 30. The first work area 10 and the second work area 20 may respectively have manual actors working therein, e.g. human workers which may load/unload the autonomous vehicle 1 before departure of the autonomous vehicle 1 in the first work area 10 and/or the second work area 20. In one example, in the first work area 10 there may be at least one manual actor present, e.g., which may be arranged to load the autonomous vehicle, e.g., using a loader. In some examples, the second work area 20 may not have any manual actors present, at least not at the same time as autonomous vehicles, and may instead only be used by autonomous vehicles such as the autonomous vehicle 1 to dump/unload materials, objects and/or goods, e.g., transported by the autonomous vehicle 1 from the first work area 10 to the second work area 20. In other words, in some examples, the first work area 10 is a loading area, and the second work area 20 is an unloading area. The predefined path 30 may not have any manual actors present and may e.g. be isolated from manual actors by the use of any one or more out of: fences, barriers, warning signs, etc.

The autonomous vehicle 1 may be configured to be constrained by operational requirements of the autonomous vehicle 1 according to a default configuration, e.g. for being able to safely navigate areas where manual actors may appear. The operational requirements may be any requirements which restricts an operation of the autonomous vehicle 1. For example, the operational requirements may restrict a maximum speed of the autonomous vehicle 1 and/or restrict how sensors and/or subsystems of the autonomous vehicle 1 are configured. In FIG. 1, it is illustrated that the autonomous vehicle 1 is positioned in the first work area 10 and has a direction D along the predefined path 30, i.e. towards the second work area 20. When it is detected that the autonomous vehicle 1 is initiating driving in the predefined path 30, the operational requirements are relaxed. Relaxing the operational requirements means that the autonomous vehicle 1 will be less limited in their ability to operate. For example, the operational requirements may be relaxed such as e.g. the maximum speed limit allowed for the autonomous vehicle 1 is increased. The autonomous vehicle 1 may then operate more efficiently in the predefined path 30. In some examples, the operational requirements may be relaxed as it is known that no manual actors will appear in the predefined path 30 and thus there is less demand for safety than in the first work area 10 and/or the second work area 20. In some examples, the operational requirements may be relaxed when the autonomous vehicle 1 is unloaded and travel in areas with manual actors. In some of these examples, the operational requirements may not be relaxed when the autonomous vehicle 1 is loaded and the autonomous vehicle 1 travels in areas with manual actors, e.g., as it may have a longer brake distance and/or a potential collision would be more dangerous due to the increased weight of the autonomous vehicle 1. In other words, when the autonomous vehicle 1 travels in areas with manual actors, strict operational requirements, e.g., a lower maximum allowed speed than when using relaxed operational requirements, may be needed to be imposed on the autonomous vehicle 1. The autonomous vehicle 1 may operate autonomously in the predefined path 30, e.g. along a path 3, using the relaxed operational requirements e.g., indefinitely, or until it is detected that the autonomous vehicle 1 is close to the second work area 20. When it is detected that the autonomous vehicle 1 is turning around towards the first work area 10, e.g. in a turnaround path 2, the autonomous vehicle 1 is at risk of operating in the first work area 10 using the relaxed operational requirements, and thus a preventive action needs to be taken, e.g. hindering/stopping the autonomous vehicle 1 and/or increasing the operational requirements back to the default configuration. This may be particularly true if the autonomous vehicle 1 is loaded. This is since when the autonomous vehicle 1 is loaded, it may be of even more importance to constrain the autonomous vehicle 1 as a loaded vehicle may be more difficult to brake and/or a collision with another vehicle or object would be more severe as an added weight to the autonomous vehicle 1 adds impact to a collision.

When operating in the predefined path 30, the autonomous vehicle 1 may be free to take own decisions of navigation, and/or may be configured to follow a virtual track arranged in the predefined path 30. Path 3 may be at least part of the virtual track. The virtual track may be predefined or may be generated dynamically e.g., based on a current vehicle pose of the autonomous vehicle 1 and/or a desired vehicle pose of the autonomous vehicle 1 which the autonomous vehicle 1 may be arranged to travel to. Additionally or alternatively, the virtual track may be generated dynamically based on a path planning routine, e.g., determined at a remote location and transmitted to the autonomous vehicle 1 during operations of the autonomous vehicle 1 in the predefined path 30. In embodiments using the virtual track, the virtual track may comprise a recorded trajectory for the autonomous vehicle 1 to follow, e.g., if possible or applicable considering other traffic or motion configurations of the vehicle.

In other words, in embodiments herein, the first work area 10 and optionally the second work area 20 may be critical work areas that need strict operational requirements since humans may be present. In some examples, strict operational requirements are not needed in the second work area 20. In some examples, strict operational requirements are needed in the first work area 10, only if the autonomous vehicle 1 is loaded, e.g., fully loaded or loaded more than a threshold in volume and/or weight. The predefined path 30 may be non-critical and relaxed operational requirements may suffice as manual actors are not to be present therein.

Embodiments herein may be performed by a control unit 70. The control unit 70 may be comprised in the autonomous vehicle 1 but may also be comprised in any other suitable location communicatively coupled with the autonomous vehicle 1, e.g. in the first work area 10, the second work area 20 or in a remote cloud environment.

To perform embodiments herein, the autonomous vehicle 1 may comprise any suitable sensor for obtaining measurements or indications herein, e.g., any one or more out of: an Inertial Measurement Unit (IMU), a speed sensor, e.g., for the vehicle or for each wheel, and a load-detection sensor, such as a pressure based load-detection sensor.

Figure 2:
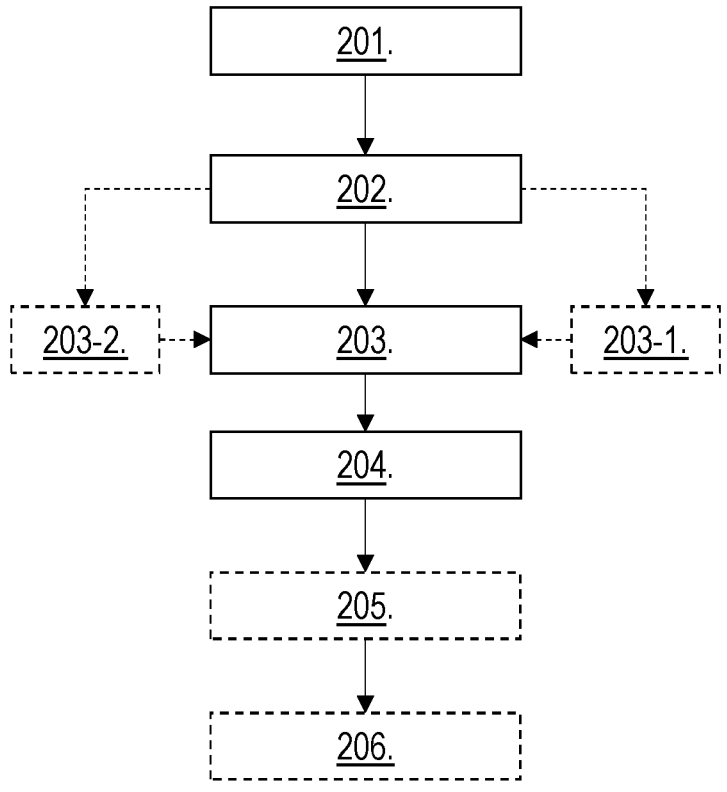
FIG. 2 is a flowchart illustrating a method according to embodiments herein.

FIG. 2 illustrates a method for handling operational requirements for the autonomous vehicle 1 driving from the first work area 10 to the second work area 20 via the predefined path 30. The operations of the autonomous vehicle 1 are constrained by the operational requirements. In some embodiments, the operational requirements comprise one or more safety constraints imposed on operations of the autonomous vehicle 1 for hindering or mitigating a collision between the autonomous vehicle 1 and manual actors. The operational requirements may be a speed limit for the autonomous vehicle 1. The method comprises the following actions described below, which actions may be taken in any suitable order.

Optional actions are indicated by dashed boxes in FIG. 2.
Action 201

The method comprises detecting that the autonomous vehicle 1 is initiating driving in the predefined path 30.

Detecting that the autonomous vehicle 1 is initiating driving in the predefined path may comprise one or more detection conditions as exemplified below, however, any suitable manner of detecting that the autonomous vehicle 1 is initiating driving in the predefined path is sufficient.

In some embodiments, detecting that the autonomous vehicle 1 is initiating driving in the predefined path 30 comprises determining that the autonomous vehicle 1 is positioned in the first work area 10 and that the driving direction D of the vehicle is 1 directed along the predefined path 30. In other words, the pose, position and direction of the autonomous vehicle 1 indicates that the autonomous vehicle 1 is initiating driving in the predefined path 30.

In some embodiments, detecting that the autonomous vehicle 1 is initiating driving in the predefined path 30 comprises detecting that the autonomous vehicle 1 is loaded, e.g. fully loaded or loaded with respect to some predefined threshold. It can be determined that the autonomous vehicle 1 is loaded by weighing the autonomous vehicle 1 or by any other determining means.

In some embodiments, detecting that the autonomous vehicle 1 is initiating driving in the predefined path 30 comprises receiving a signal indicating that the autonomous vehicle 1 is initiating driving in the predefined path 30. The signal may be received from a wireless device or stationary control device in the first work area 10, which wireless device or stationary control device is operated by a user in the first work area 10. In other words the user may signal when the autonomous vehicle 1 is to start driving in the predefined path 30 and e.g. is fully loaded and/or is directed in the direction D along the predefined path 30.

Additionally or alternatively, the signal may be derived from obtained measurements related to an operational status of the autonomous vehicle 1. For example the obtained measurements may be of brakes, acceleration, wheel speed, etc. As an example, the signal may indicate that the autonomous vehicle 1 is initiating driving in the predefined path 30, e.g., when:

brakes of the autonomous vehicle 1 have been released,
an acceleration of the autonomous vehicle 1 exceeds a threshold value,
wheels of the autonomous vehicle are detected to rotate, or
a combination thereof.

In some embodiments, an act of loading the autonomous vehicle 1 may be a way of confirming a correct direction/pose of the autonomous vehicle 1, such that the autonomous vehicle 1 is indicate to initiate driving in the predefined path 30, e.g., when the autonomous vehicle 1 initiates a motion, e.g., a forward motion. Furthermore, a loading operator may be instructed to only load the autonomous vehicle 1 if it has the correct pose, heading, and/or location.

In some embodiments herein, the autonomous vehicle 1 may be considered to be initiating driving in the predefined path 30 when it has been loaded by a loader in the first work area 10. The act of being loaded by the loader may be detected by obtaining a signal or weighing the autonomous vehicle 1.

Action 202

The method comprises, when detecting that the autonomous vehicle 1 is initiating driving in the predefined path 30, triggering a relaxation of the operational requirements. In other words, the autonomous vehicle 1 will be less constrained and may have more options available for operational/driving decisions when driving in the predefined path 30.

In some embodiments, triggering the relaxation of the operational requirements comprises any one or more out of:
increasing a maximum speed limit of the autonomous vehicle 1,
adjusting one or more sensors and/or subsystems of the autonomous vehicle 1.

Adjusting the one or more sensors and/or subsystems may comprise any one or more out of:
adjusting or switching brake system of the autonomous vehicle 1, and
disabling and/or switching an obstacle detection system of the autonomous vehicle 1.

In other words, relaxing the operational requirements may cause the autonomous vehicle 1 to be able to drive faster and/or to use sensors and subsystems which are of higher performance and/or improved resource management. When the autonomous vehicle 1 operates using the relaxed operational requirements, the autonomous vehicle 1 may rely on alternative safety guarantees than when operation using higher operational requirements. For example, some sensors in the autonomous vehicle 1 may be turned off which may lower performance or reliability of various functions, e.g. pedestrian detection and/or braking capabilities.

The autonomous vehicle 1 may before the relaxation of the operational requirements use a default operational requirement configuration. The relaxed operational requirements may be relaxed relative the default operational requirement configuration.

Action 203

The method comprises, when the autonomous vehicle 1 is driving in the predefined path 30, detecting whether the autonomous vehicle 1 turns towards the first work area 10. Detecting that the autonomous vehicle 1 turns towards the first work area 10 may be referred to as detecting a U-turn.

Detecting that the autonomous vehicle 1 drives towards the first work area 10 may comprise detecting that the autonomous vehicle 1 is driving in a way which may cause the autonomous vehicle 1 to turn 180 degrees, but may also comprise detecting turning motions which are less than 180 degrees, e.g. 170 degrees, as long as there is a risk of the autonomous vehicle 1 turning around towards the first work area 1. In some embodiments, detecting that the autonomous vehicle 1 drives towards the first work area 10 may also comprise detecting that the autonomous vehicle 1 is driving in reverse.

Detecting whether the autonomous vehicle 1 turns towards the first work area 10 may comprise one or more detection conditions as exemplified below, however, any suitable manner of detecting whether the autonomous vehicle 1 turns towards the first work area 10, or not, is sufficient.

In some embodiments, detecting whether the autonomous vehicle 1 turns towards the first work area 10 comprises:
estimating a turning radius of the autonomous vehicle 1, and
comparing the estimated turning radius with a predefined width of the predefined path 30.

The comparison may deduce whether or not the turning radius means that the vehicle will have a turning path which extends beyond or within the predefined width. Since the radius is compared to the width of the predefined path 30, all types of turns towards the first work area 10 may be detected, and it is thus possible to ensure whether or not the autonomous vehicle 1 is turning around towards the first work area 10.

In some embodiments, the predefined width may account for some margin of error and be a short interval instead of a fixed absolute number. The predefined width may be a conservative estimate to ensure that it is always detected when the autonomous vehicle 1 may turn around.

In some embodiments, the autonomous vehicle 1 is detected to turn towards the first work area 10 when $2R-K \leq W$. In these embodiments R is the estimated turning radius of the autonomous vehicle 1, K is a preconfigured margin constant, and W is a predefined width of the predefined path 30. Thus, if two times the radius R is less than the width W of the predefined path 30, accounting for some margin K, then the autonomous vehicle 1 is detected to be turning towards the first work area 10. In some of these embodiments, the preconfigured margin constant K may include compensation for a width of the autonomous vehicle 1, e.g. which may in some scenarios cause the constant to be negative.

In some embodiments, detecting whether the autonomous vehicle 1 turns towards the first work area 10 comprises:
estimating an average turning radius of the autonomous vehicle 1 for a predetermined past time period, and
comparing the estimated turning radius with a predetermined maximum allowed average turning radius for the predetermined past time period.

The average turning radius may be computed for every 1 time unit, e.g. seconds, for the past few seconds, e.g. 1 to 5 seconds. Thus, if above the predetermined maximum allowed average turning radius, e.g. 5 to 30 meters, then it can no longer be ensured that the autonomous vehicle 1 is not turning towards the first work area 10. Thus the autonomous vehicle 1 is detected to be turning towards the first work area 10.

In some embodiments, detecting whether the autonomous vehicle 1 turns towards the first work area 10 comprises:
measuring an aggregated turning angle of the autonomous vehicle 1, wherein the aggregated turning angle indicates a total angle turned by the autonomous vehicle 1 when driving in the predefined path 30, and
comparing the aggregated turning angle with a predetermined maximum allowed steering wheel angle of the autonomous vehicle 1.

The aggregated turning angle may indicate how much the autonomous vehicle 1 has turned in total. As the predefined path 30 may have predefined curvatures, the predetermined maximum allowed steering wheel angle can be calculated in advance, and if exceeding this maximum allowed steering wheel angle, it is detected that the autonomous vehicle 1 turns or at least risks turning around towards the first work area 10, and thereby it is needed to trigger the preventive action.

In some embodiments, estimating the turning radius and/or measuring the aggregated turning angle comprises, based on a current vehicle speed and/or a wheel speed profile, determining one or more turning parameters for a predetermined future time period. The wheel speed profile may be an average speed of the vehicle or a wheel of the vehicle for a set period of time. The turning parameters may comprise any one or more out of: a yaw rate, a steering wheel angle, and a lateral acceleration of the autonomous vehicle 1. Any of these parameters, independently or in any suitable combination, may be used to measure how the autonomous vehicle is turning, and/or predict how the autonomous vehicle will turn, i.e., in the future time period.

In some embodiments, estimating the turning radius and/or measuring the aggregated turning angle comprises determining a turning path P for the autonomous vehicle 1. It may further be detected if the turning path P extends in a lateral distance less wide than the width of the predefined path, and if so, the autonomous vehicle 1 may be considered to be turning towards the first work area 10.

In some embodiments, detecting whether the autonomous vehicle 1 turns towards the first work area 10 comprises obtaining an angular change in orientation of the autonomous vehicle 1 over a distance window defining a distance travelled by the autonomous vehicle 1, and detecting that the autonomous vehicle 1 turns towards the first work area 10 when the angular change in orientation exceeds a threshold. The threshold may be an angular threshold. The angular change in orientation may be a change, e.g., a cumulative change, in yaw angle of the autonomous vehicle 1. The distance window may be a buffer of obtained measurements. The distance window may be limited to a set period of distance and/or time for operating the autonomous vehicle 1.

In some embodiments, the angular change in orientation of the autonomous vehicle 1 over the distance window is a cumulative sum of a plurality of yaw angles measured or estimated by the autonomous vehicle 1 over the distance travelled by the autonomous vehicle 1. In other words, the autonomous vehicle 1 may measure or estimate the angular change in orientation, e.g., the yaw angle, of the vehicle in the distance window such as to detect whether the autonomous vehicle 1 turns towards the first work area 10 in the distance window. Estimation of the angular change in orientation may comprise any suitable estimation, e.g., based on one or more yaw angles at different points in time, or based on a statistical model, e.g., a Kalman filter, or machine learning model. In some of these embodiments, the machine learning model may be trained to estimate the angular change in orientation based on any suitable vehicle motion parameters, e.g., motion and/or speed and/or acceleration per wheel and/or vehicle motion as a whole. In some of these embodiments, the statistical model may comprise Kalman filter also accounting for any suitable vehicle motion parameters, e.g., motion and/or speed and/or acceleration per wheel and/or vehicle motion as a whole. The distance window may be a distance of a set length, predefined or dynamically set. The distance of the set length may be a distance that is the most recent distance travelled by the autonomous vehicle 1, e.g., in the predefined path 30. In other words, the distance window may be the most recent distance travelled by the autonomous vehicle 1, of the set length.

The set length of the distance window may be based on, e.g., limited by, a minimal turning radius r of the predefined path 30. Additionally or alternatively, the set length of the distance window may be based on, e.g., limited by, a size d, e.g., a width, of the predefined path 30 and/or the first work area 10.

For example, the distance window, also referred to as a length of recorded history may be defined by the following relation (inequality) of Equation (1):

$$\text{length of distance window} >= \frac{d - (1 - \cos(a)) * r}{\sin(a)} \qquad \text{Equation (1)}$$

In this example, the size d may be a length of a bounding rectangle of a region of interest in the first work area 10 and/or the predefined path 30. For example, the size d may be a distance between sides that align with a driving direction of a bounding rectangle that subsumes a loading zone, e.g., the first work area 10, which the autonomous vehicle 1 should not turn towards when operating using the relaxed operational requirements. In the example, r may be the minimal turning radius the autonomous vehicle 1 is capable of, and/or possible to perform in the predefined path 30. In Equation (1) above, the parameter a may be defined to be ((180−angular_threshold)/2). The angular_threshold may be the threshold which determines whether or not to detect that the autonomous vehicle 1 has turned towards the first work area 10. In other words, the angular threshold, as defined by the angular_threshold parameter, and the length of the distance window may both be unknowns, and may have a relationship as in the inequality of Equation (1). The length of the distance window and/or the angular threshold may be set according to any suitable procedure, which then defines, or at least limits a selection of the other parameter.

In some embodiments, obtaining the angular change in orientation of the autonomous vehicle 1 over the distance window comprises obtaining an uncertainty of the obtained angular change in orientation of the autonomous vehicle 1, and wherein detecting that the autonomous vehicle 1 turns towards the first work area 10 is further based on the obtained uncertainty. For example, detecting that the autonomous vehicle 1 turns towards the work area 10 may be performed by comparing the angular change in orientation, or a cumulative sum thereof, with a set angular threshold, e.g., the angular_threshold parameter above. In some embodiments, the angular change in orientation, or the cumulative sum thereof may be adjusted based on the obtained uncertainty before comparison with the set angular threshold. In a corresponding manner, it may also be possible to instead adjust the set angular threshold, e.g., the angular_threshold parameter above, based on the obtained uncertainty. The set angular threshold may be predefined or dynamically set, e.g., based on the length of the distance window. In some embodiments, the angular threshold may be expressed in angular degrees, but other units of measuring angles may also apply, such as radians.

In any of the above examples and embodiments for how to detect whether the autonomous vehicle turns towards the first work area 10, detecting whether the autonomous vehicle 1 turns towards the first work area 10 may comprise estimating a risk that the autonomous vehicle 1 has turned towards the first work area 10, and detecting that the autonomous vehicle has turned towards the first work area 10 when the risk exceeds a threshold. In other words, the above-mentioned detection may be speculatively, with respect to a risk and/or uncertainty, and wherein the detection may account for all risks and/or uncertainties and err on the side of caution by detecting that the autonomous vehicle 1 turns towards the first work area 10 if there is any risk indicating that the autonomous vehicle 1, theoretically may have done so, e.g., at all or within the above-mentioned distance window.

Action 203-1

Action 203-1 may be part of Action 203, and/or performed in conjunction with Action 203 as described above. According to some examples, the method may further comprise maintaining the relaxed operational requirements until detecting, e.g., as in Action 203 above, that the autonomous vehicle 1 turns towards the first work area 10. The autonomous vehicle 1 may then operate indefinitely using the relaxed operational requirements as long as it is not detected to turn back towards the first work are 10, wherein the autonomous vehicle 1 may need to be stopped, or the operational requirements may need to be set back to a stricter setting, e.g., to decrease the maximum allowed speed limit back to a default strict setting. As an example, maintaining the relaxed operational requirements until detecting that the autonomous vehicle 1 turns towards the first work area 10 may comprise maintaining the relaxed operational requirements until detecting that the autonomous vehicle 1 turns towards the first work area 10 while the autonomous vehicle 1 is loaded. In other words, if the autonomous vehicle 1 is unloaded, e.g., when it reaches the second work area 20 or at any other suitable location, the autonomous vehicle 1 may travel and turn around towards the first work area 10 while operating using the relaxed operational requirements. This is since when the autonomous vehicle 1 is unloaded, the autonomous vehicle 1 may no longer be considered a risk to other manually driven vehicles in the first work area 10. This is since the autonomous vehicle 1 may quicker brake and/or impose less impact in case of a collision when being unloaded. In this example, the autonomous vehicle 1 may, when being unloaded, turn around towards the first work area 10 using the predefined path 30 or an alternative path. However, when the autonomous vehicle 1 is loaded, then it needs to be detected when the autonomous vehicle 1 turns towards the first work area 10 such that it may be prevented that the autonomous vehicle 1 drives towards the first work area 10 using the relaxed operational requirements.

Action 203-2

Action 203-2 may be part of Action 203, and/or performed in conjunction with Action 203, as described above. The method may further comprise establishing the angular change in orientation of the autonomous 1 over the distance window by estimating a change in yaw angle and a change in distance travelled by the autonomous vehicle 1. The change in yaw angle and/or the change in distance travelled by the autonomous vehicle 1 may be stored in a buffer and/or added in one or more stored variables as a sum. The change in yaw angle may be stored as a cumulative sum, e.g., with respect to each direction which the autonomous vehicle 1 may be able to turn around towards the first work area 10.

In some embodiments, estimating the change in yaw angle and change in distance travelled by the autonomous vehicle 1 is performed periodically when the autonomous vehicle 1 is travelling in the predefined path 30. In some embodiments, estimating the change in yaw angle and change in distance travelled by the autonomous vehicle 1 is performed based on an event, e.g., during an action performed by the autonomous vehicle 1.

Action 204

When detecting that the autonomous vehicle 1 turns towards the first work area 10, e.g. as in Action 203 above, the method comprises triggering a preventive action for preventing the autonomous vehicle 1 from driving towards the first work area 10 using the relaxed operational requirements. Any suitable preventive action for hindering the autonomous vehicle 1 to drive towards the work area 10 using the relaxed operational requirements, e.g., when being loaded, may be used and many different alternatives exists.

For example, in some embodiments, triggering the preventive action comprises any one or more out of:

triggering an increase of the operational requirements, e.g. back to the default configuration
triggering an emergency stop,
triggering a handover to a remote control drive mode,
triggering an alert, and
triggering an adjustment and/or limitation of a turning angle of the autonomous vehicle 1.

In any case, the preventive action ensures that the autonomous vehicle 1 will not endanger any manual actors in the first work area 10 by driving therein using the relaxed operational requirements.

Action 205

The method may further comprise measuring a distance and/or time driven in the predefined path 30. This may be performed by any suitable method, e.g. by use of internal sensors in the autonomous vehicle 1. Action 205 may be performed in scenarios when the second work area 20 is not suitable for travelling using the relaxed operational requirements, e.g., when manual actors may be present in the second work area 20.

Action 206

The method may further comprise, when the measured distance and/or time driven in the predefined path 30 of Action 205 fulfil at least one predetermined condition, triggering an increase of the operational requirements. Triggering an increase of the operational requirements as used in embodiments herein means to cause the operational requirements to be stricter, i.e. the operational requirements will be less relaxed. For example, decreasing the maximum speed limit allowed by the autonomous vehicle 1.

The at least one predetermined condition may indicate that the autonomous vehicle 1 is likely to be very close to the second work area 20, at least when driving along the predefined path 30, e.g. using a maximum speed limit allowed for the predefined path 30, e.g., as indicated by the relaxed operational requirements.

In some embodiments, wherein the at least one predetermined condition is fulfilled when the measured distance is above a predefined distance threshold. Thus if driving the shortest possible route, the autonomous vehicle 1 may be a known distance from the second work area 20.

In some embodiments, the at least one predetermined condition is fulfilled when the measured time multiplied with a predetermined max speed of the predefined path 30 is above the predefined distance threshold. The reasoning is the same as for with the measured distance mentioned above, but instead time and the max speed is considered to deduce a distance travelled by the autonomous vehicle 1 if driven as fast as possible at the shortest possible route of the predefined path 30 between the first work area 10 and the second work area 20.

In some embodiments, triggering the increase of the operational requirements comprises resetting the operational requirements, e.g. back to the default configuration.

In some embodiments, triggering the increase of the operational requirements comprises any one or more out of:

decreasing a maximum speed limit of the autonomous
vehicle 1, and adjusting one or more sensors and/or subsystems of the
autonomous vehicle 1.

This may be an inverse operation from what is performed
in Action 202 above.

The methods will now be further explained and exempli-
fied in below embodiments. These below embodiments may
be combined with any suitable embodiment as described
above.

Figure 3A:
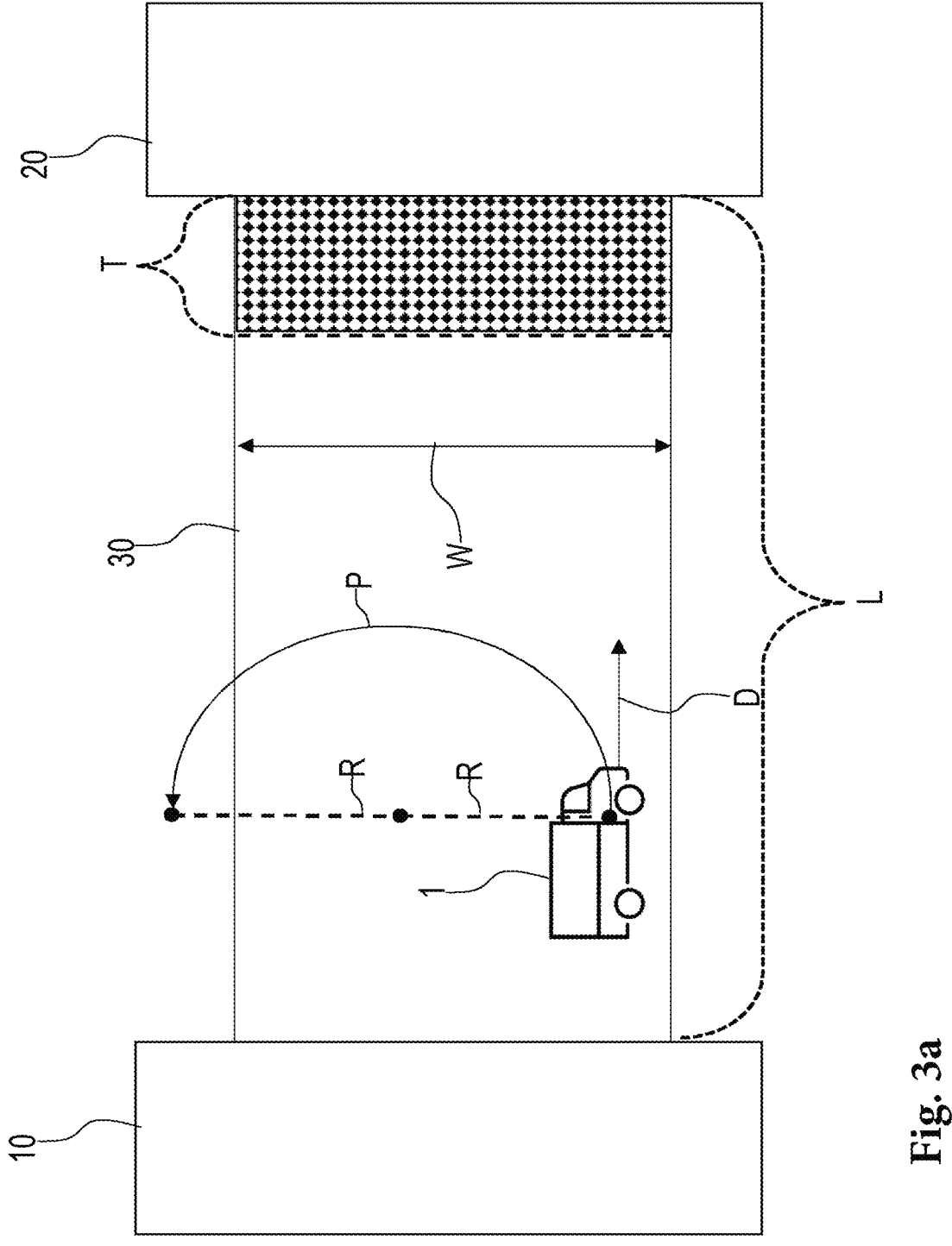
FIGS. 3*a*-3*c* are illustrations of example scenarios of an autonomous according to embodiments herein.

FIG. 3a illustrates an example scenario wherein the
autonomous vehicle 1 is driving using the relaxed opera-
tional requirements in the predefined path 30 in a longitu-
dinal direction D towards the second work area 20. The
predefined path 30 has in the example scenario a predefined
width W in a transverse direction and a predefined length L.
The predefined path 30 comprises an area bounded by a
threshold distance T before the second work area 20. In the
example scenario of FIG. 3a, it is detected that the autono-
mous vehicle 1 is starting to turn and a turning radius R is
estimated for the autonomous vehicle 1. The turning radius
R may be used to deduce an estimated position of the
autonomous vehicle 1 if upon a completion of the turn, the
estimated position being a transverse distance corresponding
to 2R away from the starting position. Using the radius R, it
may be possible to derive a turning path P for how the
autonomous vehicle 1 would drive to said estimated posi-
tion. Since the width W is known for the predefined path 30,
it is possible to deduce that said estimated position would
not be possible as the autonomous vehicle 1 would, after the
completed turn, be outside of the predefined path 30, i.e. as
2R is at least as wide as the predefined width W. Thus, in the
example scenario, the autonomous vehicle 1 is detected to
not be turning around and may keep operating using the
relaxed operational requirements, e.g. as in Action 203
above. When an estimated distance and/or time indicates
that the autonomous vehicle has driven a distance corre-
sponding to the difference of the length L and the distance
T, e.g. as in Action 206 above, it is detected that the
autonomous vehicle 1 is close to the second work area 20,
and thus, increased operational requirements need to be
triggered to ensure safety of manual actors in the second
work area 20.

Figure 3B:
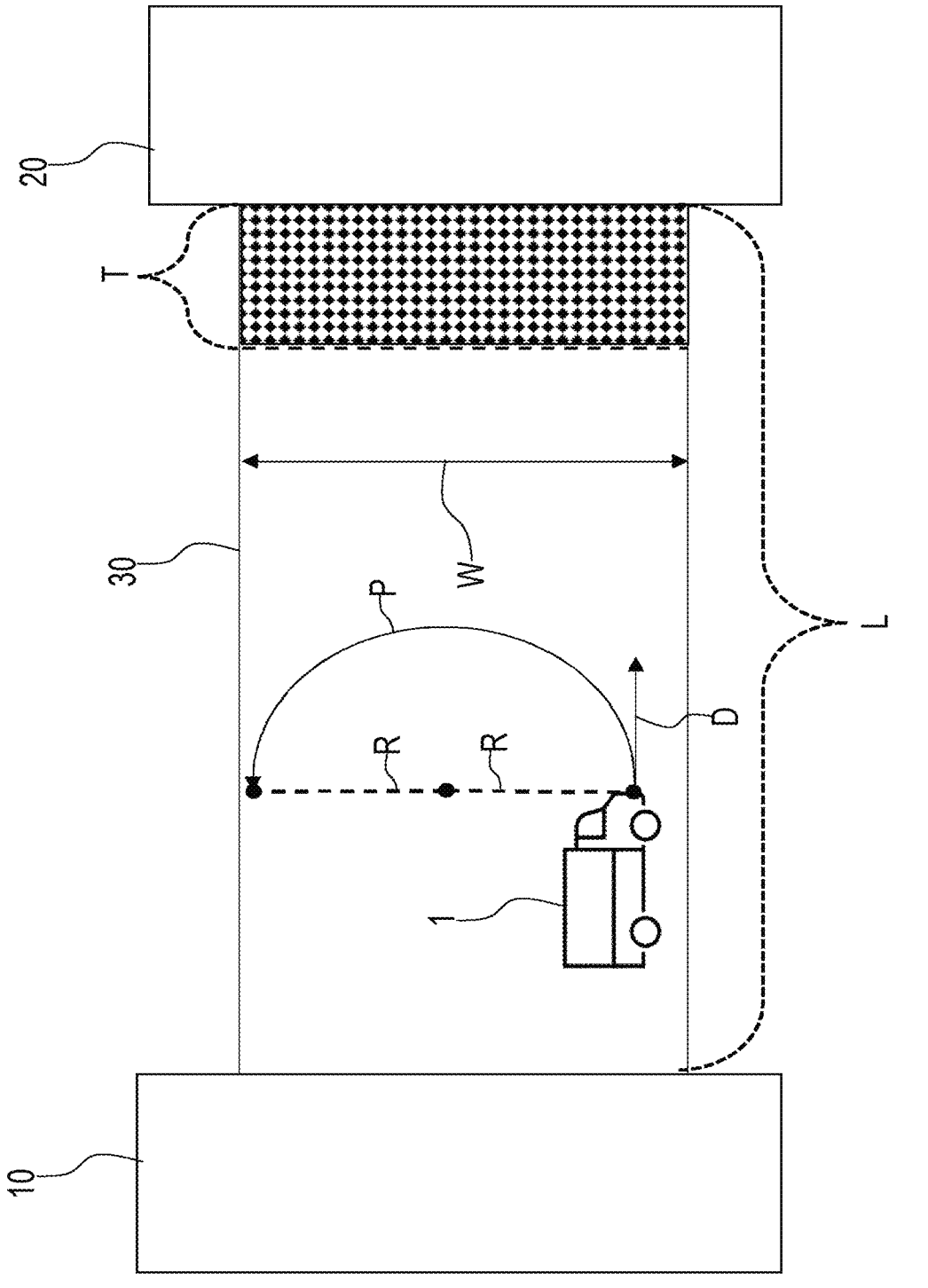

FIG. 3b illustrates an example scenario wherein the
autonomous vehicle 1 is driving using the relaxed opera-
tional requirements in the predefined path 30 in the direction
D along the predefined path 30 towards the second work area
20. Different from the example scenario of FIG. 3a, the
turning radius R is estimated to be shorter. Thus when
comparing 2R to the predefined width W, it can be detected
that when the autonomous vehicle 1 drives around in the
turning path P, the autonomous vehicle 1 may be turning
towards the first work area 10, e.g. as in Action 203, and
thus, increased operational requirements need to be trig-
gered to ensure safety of manual actors in the first work area
10.

Figure 3C:
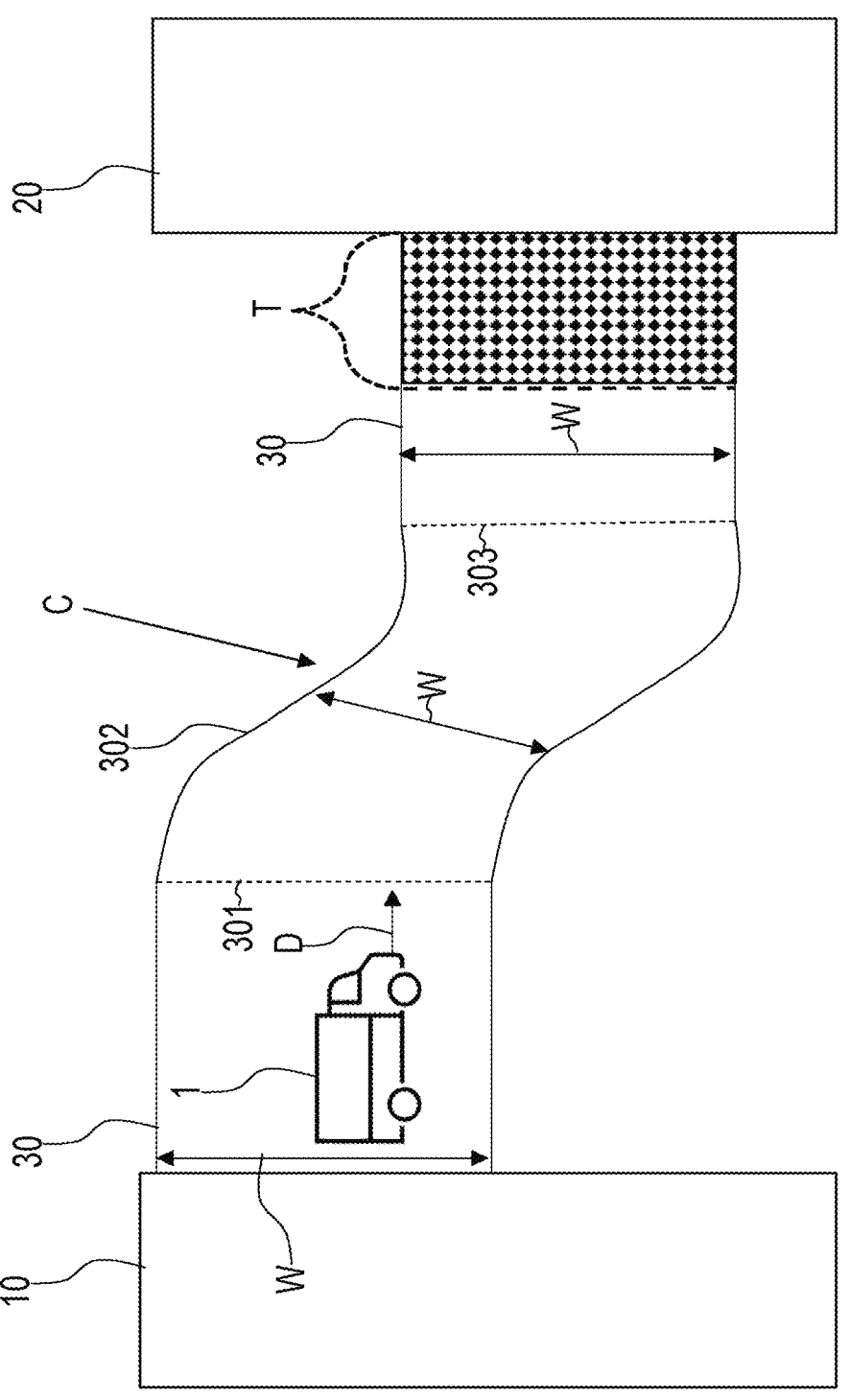

FIG. 3c illustrates an example scenario wherein the
autonomous vehicle 1 is driving using the relaxed opera-
tional requirements in the predefined path 30 in the direction
D along the predefined path 30 towards the second work area
20. In this example scenario there is a curvature C, wherein
there is a predefined angle change when the predefined path
30 turns from a starting point 301 to an end point 303. In the
example scenario, an angle necessary for the autonomous
vehicle 1 to turn in a turning area 302 of the curvature C is
predefined, e.g. may be a total angle change of the curvature
C. While a simple curvature C is illustrated in the example scenario, the predefined path 30 may have multiple curva-
tures with different angle changes in the predefined path 30.
In this scenario the predefined width W is the same in all of
the predefined path 30, except for small margin of errors,
e.g. when starting/initiating driving in the curvature C. Since
all angles may be known in the predefined path 30, e.g. as
the curvature C is predefined, it may be analyzed and
determined in advance how much the autonomous vehicle 1
need to be able to turn, and thereby the autonomous vehicle
1 may be restricted by being configured with a predeter-
mined maximum allowed steering wheel angle. The prede-
termined maximum allowed steering wheel angle may be
adapted to at least allow for all angles needed to turn the
autonomous vehicle 1 in the curvature C e.g., with some
added angle margin to allows for some error and/or room to
operate. In this way, it may be detected that the autonomous
vehicle 1 turns around towards the first work area 10 when
the predetermined maximum allowed steering wheel angle is
exceeded. When the autonomous vehicle 1 drives in the
curvature C, it may also be detected that the autonomous
vehicle 1 turns around towards the first work area 10, by the
same procedure as described in Action 203, e.g. as when
driving on a straight path.

The following features, alternatives, and configurations
may be used in combination with and/or instead of any one
of the above-mentioned embodiments and examples.

Ensuring that the autonomous vehicle 1 starts driving in
a certain direction from a certain position or area, e.g. as in
Action 201, may comprise any one or more out of:

Ensure that an operator only loads/unloads the autono-
mous vehicle 1 when the autonomous vehicle 1 has the
correct pose, e.g. position+direction. The autonomous
vehicle 1 may then detect when it is being loaded/
unloaded through measuring a load/weight of the
autonomous vehicle 1, e.g. relative a reference weight.

An operator may be responsible to confirm the pose of the
autonomous vehicle 1 and confirm it through e.g.: a
button on the autonomous vehicle 1 and/or through
another unit communicatively coupled with the autono-
mous vehicle 1 e.g. via a Vehicle to Everything (V2X)
communications interface.

The autonomous vehicle 1 may estimate its pose through
localizing itself with an anchor point, e.g. using one or
more transponders located at relevant positions.

Allowing less strict safety requirements, e.g. as in Action
202 above, may comprise one or more out of:

Increase/change a speed limit.

Increase/change available subsystems, e.g. rely on differ-
ent brake systems or different sensors.

Run in a different mode, e.g. turn off or change obstacle
detection systems.

Ensuring that the autonomous vehicle 1 does not turn
around while driving in the predefined path 30, e.g. as in
Action 203 above, may comprise any one or more out of:

There may be different measures to ensure that the
autonomous vehicle 1 does not reach a sufficiently
small turning radius to allow for turning around on a
path/road. For example yaw rate+speed, steering wheel
angle(s) and lateral acceleration are all states for which
there are comparatively easy ways to achieve high
integrity measurements.

The chosen measurement may be monitored in different
ways. The simplest solution may be to monitor whether
a minimum turning radius is ever exceeded. However,
in order to turn around on the predefined path 30 it is
typically required to maintain a turning radius less than
or equal to the minimum turning radius for quite some time. Thus, it may be possible to use an aggregate of the last measurements over a certain time. This would mean that short periods of time with high steering would not necessarily be detected as turning around. Depending on implementation, the measurement uncertainties may increase over time rather than over distance. In order to reduce the potential uncertainties a minimum average speed over a certain amount of time may also be used for detecting whether the autonomous vehicle 1 is turning around.

Determine when stricter safety requirements need to become active again, e.g. as in Actions 205-206 above, may comprise any one or more out of:

Comparing a distance driven to the distance of the predefined path 30.

Comparing the time driven to the time it would take to drive from the first work area 10 to the second work area 20 at maximum speed.

A machine state is changed, for example whether the autonomous vehicle 1 is loaded or unloaded.

Enable stricter safety requirements, e.g. by adjusting any one or more out of:

a. speed limits, e.g. reduce speed limit.

b. activate functionality, e.g. activate certain obstacle avoidance functions.

c. different configurations of functions, e.g. an obstacle avoidance function may be tuned to avoid false positives while in an area without manual actors and then turned back on again.

Figure 4:
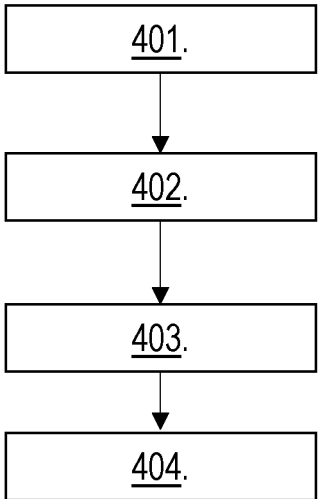
FIG. 4 is a flowchart illustrating a method according to embodiments herein.

FIG. 4 illustrates a method for handling operational requirements for the autonomous vehicle 1 driving from the first work area 10, e.g., to the second work area 20 via the predefined path 30. The operations of the autonomous vehicle 1 are constrained by the operational requirements. In some embodiments, the operational requirements comprise one or more safety constraints imposed on operations of the autonomous vehicle 1 for hindering or mitigating a collision between the autonomous vehicle 1 and manual actors. The operational requirements may be a speed limit for the autonomous vehicle 1. In this method, the autonomous vehicle 1 may be arranged to be loaded in the first work area 10. The method may be combined in any suitable manner with the actions of FIG. 2 above.

The purpose of the method is to prevent dangerous collisions between the autonomous 1 vehicle and a machine operated by a human (e.g., wheel-loader) in a loading zone. Rather than relying on localization and perception for this task, the method may rely solely on one or more "inwards-facing" sensors, i.e., IMU, speed estimation sensor, and pressure-based load-detection sensors of the autonomous vehicle 1. The method may comprise the following actions described below, which actions may be taken in any suitable order.

Action 401.

The method may comprise detecting when the autonomous vehicle becomes loaded. Action 401 may be performed instead of, or combined with action 201. In other words, when it is detected that the autonomous vehicle 1 becomes loaded, it may be detected that the autonomous vehicle initiates driving in the predefined path 30.

Action 402.

The method may comprise enabling a safety mechanism to ensure that the autonomous vehicle 1 does not turn around while driving on a path/road, e.g., the predefined path 30 and/or when still operating in the first work area 10. The safety mechanism may for example part of above-mentioned actions, e.g., action 203. The preferred safety mechanism may be to detect whether or not the autonomous vehicle 1 turns towards the first work area by obtaining the angular change in orientation of the autonomous vehicle 1 over the distance window defining the distance travelled by the autonomous vehicle 1, and detecting that the autonomous vehicle 1 turns towards the first work area 10 when the angular change in orientation exceeds the threshold.

At this point, the autonomous vehicle 1 may be triggered to, or allowed to continue to, operate using the relaxed operational requirements as discussed above, e.g., a lower speed limit. If detecting that the autonomous vehicle 1 turns around towards the first work area 10, the autonomous vehicle 1 may be triggered to stop or to increase the operational requirements.

Action 403.

The method may comprise detecting when the autonomous vehicle 1 becomes unloaded. The autonomous vehicle 1 may for example dump or otherwise unload its cargo, objects, materials, etc. in the second work area 20.

Action 404.

The method may comprise disabling the safety mechanism, e.g., as enabled in action 402. The disabling of the safety mechanism may be performed in response to detecting that the autonomous vehicle 1 becomes unloaded, as detected in action 403. The autonomous vehicle 1 may then further travel to the first work area 10, e.g., by turning towards the first work area 10, and still operate using the relaxed operational requirements. This may be allowed as when the autonomous vehicle 1 is unloaded, it fulfils security and/or safety protocols of the first work area 10 and can be allowed to travel towards or in the first work area 10 using the relaxed operational requirements.

Figure 5:
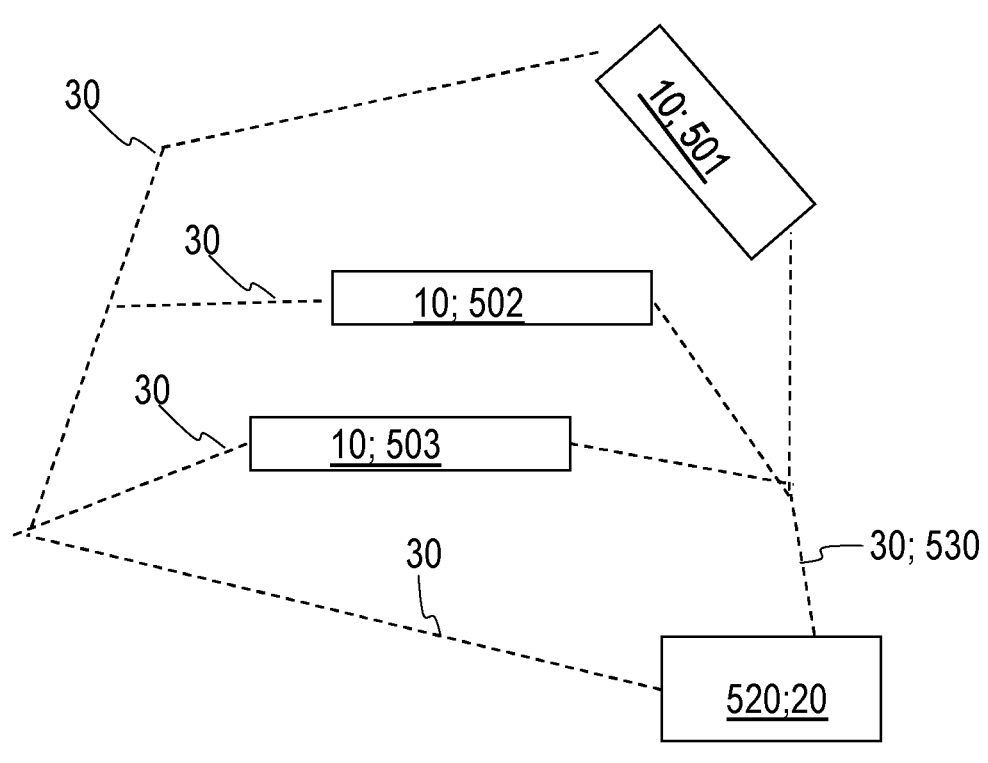
FIG. 5 is a schematic diagram illustrating an example scenario according to embodiments herein.

Many types of confined areas, e.g. open-pit mines and/or quarries are structured as illustrated in FIG. 5, with designated areas where the automated vehicles can be loaded in loading areas 501, 502, 503 and unloaded in at least one unloading area 520. A road network may connect these areas, e.g., the predefined path 30 and/or an alternative path 530. Any one of the loading areas 501, 502, 503 may comprise the first work area 10. The at least one unloading area 520 may comprise the second work area 20. On many sites, the roads, such as the predefined path 30, may be physically delimited by barriers and/or cliffs, whereas the loading and unloading areas 501, 502, 503, 520 may be positioned within larger open areas. In particular, the width in a driving direction is significantly smaller on the road network than the loading/unloading areas. Hence, detecting whether or not the autonomous vehicle 1 turns around towards the first work area 10, e.g., as in action 203, may be performed by assuming a width or size according to the unloading or loading areas 501, 502, 503, 520.

While unloading typically does not require human presence, loading often does. In particular, a human operator in, e.g., a wheel-loader may load material on the autonomous vehicle 1 when in the first work area 10, which thereafter proceeds to the at least one unloading area 520, e.g., the second work area 20, by first crossing a loading zone comprising the first work area 10 and then travelling the predefined path 30, which may involve traversing other loading areas 501, 502, 503. Once on the predefined path 30, the limited width of the predefined path 30 is often too small for the autonomous vehicle 1 to unintentionally turn back and to re-enter the initial loading zone, i.e., it may be too narrow for the autonomous vehicle 1 to turn around in most areas of the predefined path 30. Therefore, in some situations, it may be enough to require a safety collision avoidance mechanism in the loading areas 501, 502, 503. However, in some situations, it may be possible for the autonomous vehicle 1 to turn around in the predefined path 30 as well, and hence, detection of such an action may be required.

In some embodiments, the autonomous vehicle 1 may be an automated hauler or similar machine which are relatively light when unloaded, e.g., below a set threshold in weight. Furthermore, the autonomous vehicle 1 may have a relatively low maximum speed and may be physically small compared to machines operated by humans, e.g., wheel-loaders. As such, the autonomous vehicle 1 may only pose a risk to manual actors when it is loaded and driving with speeds above a certain threshold. For such cases, a collision avoidance mechanism may only be required when the autonomous vehicle 1 is in a loading zone, e.g., comprising the first work area 10, is loaded, and is driving at a speed above a threshold.

Embodiments herein may use a high-integrity method, e.g., as in above actions 201-205, 401-404, that ensures that no dangerous collisions occur with the autonomous vehicle 1 and manual actors, e.g., in wheel loaders of loading areas 501, 502, 503, e.g., in the first work area 10. Embodiments herein may be performed without the use of high-integrity localization or perception such as Global Positioning Systems (GPS) or Light Detection and Ranging (LIDAR) sensors.

Embodiments herein may comprise preventing the autonomous vehicle 1 from driving at a relaxed operational requirement, i.e., a high speed, when being in an area where it was loaded, i.e. the first work area 10. Embodiments herein may further be combined with operating instructions restricting manual actors, e.g., a wheel-loader operator, to not drive the wheel-loader outside the first work area 10 or loading area comprising the first work area 10. This may be realized in software through a mechanism that restricts the speed or other operational requirements of the autonomous vehicle 1 if it turns around after having been loaded, where the turning around may be estimated as in above-mentioned actions and/or through observations of the vehicle yaw-rate, obtained from the IMU of the autonomous vehicle 1.

Figure 6:
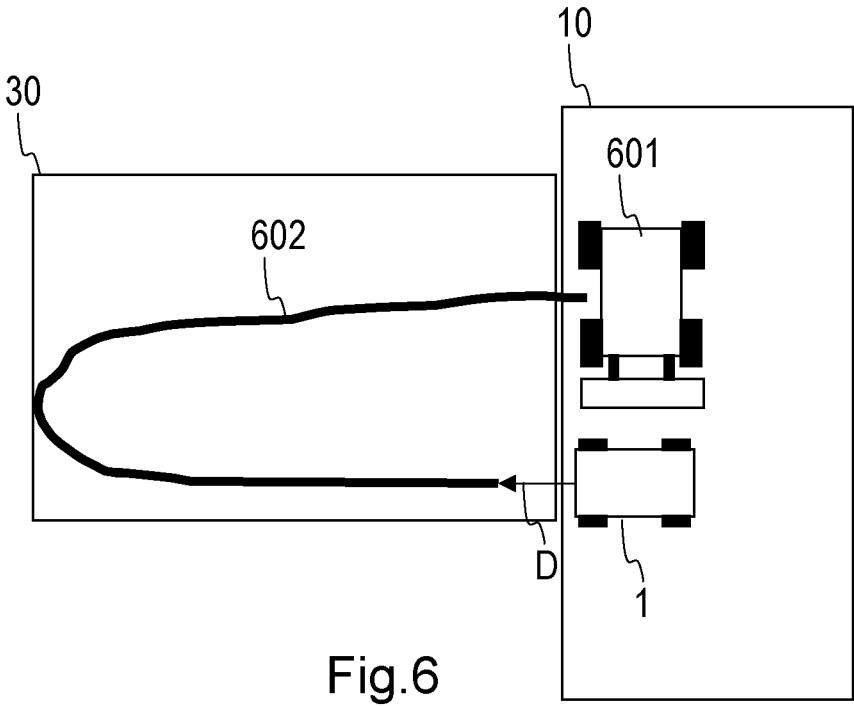
FIG. 6 is a schematic diagram illustrating an example of an autonomous vehicle according to an example scenario herein.

In FIG. 6, an example wheel-loader 601 loading the autonomous vehicle 1 in the first work area 10 is illustrated. A manual actor is present in the example wheel-loader 601. The autonomous vehicle 1 may then initiate driving in the predefined path 30 in a driving direction D using an increased maximum allowed speed above a threshold, e.g., as a response to being loaded by the wheel-loader 601. If it is detected that the autonomous vehicle 1 turns around towards the first work area 10 according to path 602, then, if the autonomous vehicle 1 would drive in the first work area 10, being loaded, with the increased maximum allowed speed, the manual actor of the wheel-loader 601 would be in danger, and hence, the autonomous vehicle 1 may need to be triggered to stop, or to reduce its speed to below a threshold.

When the loading is completed, the autonomous vehicle 1 may initiate driving in the predefined path 30 and may start the following procedure, which it repeats periodically in cycles wherein a cycle may be one iteration of steps 1-5, e.g., iterated every set time period:

Step 1) Estimate a change in orientation since a previous cycle,

Step 2) Estimate a distance travelled since the previous cycle,

Step 3) Store the estimates of Steps 1 and 2, in Angle and Distance buffers,

Step 4) Incrementally check if a cumulative sum of previous orientation changes exceeds a threshold value, and if true, restrict the speed until the autonomous vehicle 1 is unloaded. When the orientation of the autonomous vehicle 1 exceeds the threshold value, then it is detected that the autonomous vehicle 1 turns towards the first work area 10. The check may preferably be from a front position of the buffers, e.g., to first check the most recently distances cycles.

Step 5) Stop checking when the cumulative sum of previous distance travelled changes exceeds a threshold value. This is since the autonomous vehicle 1 have reached a position in which it is unlikely that the autonomous vehicle 1 will turn back. This might for example be since the path for the autonomous vehicle 1 is a narrow area where a turn is not possible, or the autonomous vehicle 1 has reached an area wherein it is re-configured, e.g., at the second work area 20.

The above Steps 1-5 may correspond to and/or be combined with any actions mentioned above. Steps 1-5 may be interpreted in the following manner: The procedure of Steps 1-5 may keep track of historical changes in orientation of the autonomous vehicle 1 over a distance window in space, i.e., all orientation changes of the autonomous vehicle 1 over the last X driven meters.

At each cycle of Steps 1-5, the procedure may first update its record of history based on new sensor information, e.g., as obtained at least partly from the IMU of the autonomous vehicle 1, and thereafter check that each sum of angular changes summarized from the most recent to second most recent, to the third most recent, etc., up until the last recent measurement is/are, below a certain threshold in absolute value. If any of these sums are above the threshold in absolute value, it sets a persistent indication that the autonomous vehicle 1 might have or have turned around towards the first work area 10. Persistent as used herein means that once a potential U-turn is detected, it will not be reset until the autonomous vehicle 1 has unloaded and then loaded again, i.e. if the autonomous vehicle 1 cannot turn back to an initial path in order to "reset" or revert the U-turn detection. This means that at each cycle, the autonomous vehicle 1 checks, e.g., as in action 203, whether it has made a U-turn on any of the subsets of its driven recorded history that starts or ends in its current position.

Steps 1-5 above may additionally or alternatively, in any combination of above, relate to setting a persistent flag indicating that the autonomous vehicle 1 has not turned towards the first work area 10. If, subsequently, there is a detection that the cumulative sum is above a set angular threshold, or as in action 203, then the persistent flag is set to indicate that the autonomous vehicle 1 has turned towards the first work area 10. Based on the persistent flag, the operational requirements of the autonomous vehicle 1 may be set, e.g., the speed allowed for the autonomous vehicle 1 may be set according to the persistent flag. The persistent flag may be reset when the autonomous vehicle 1 is unloaded.

Figure 7:
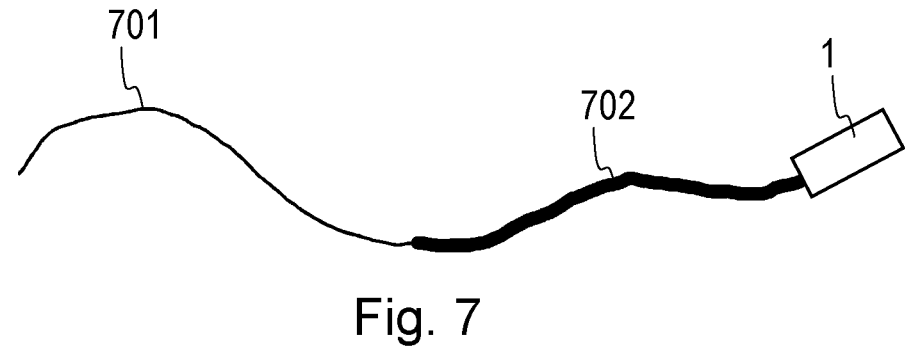
FIG. 7 is a schematic diagram illustrating a distance window according to embodiments herein.

To perform embodiments herein, the angular changes of the autonomous vehicle 1 may, as discussed briefly above, be tracked over a distance window of where the autonomous vehicle 1 has travelled, e.g., in the predefined path 30. An example distance window is illustrated in FIG. 7 as a recorded distance window 702, wherein changes in orientation of the autonomous vehicle 1 is established, e.g., recorded, when the autonomous vehicle 1 travelled one or more parts of the distance window 702. The distance window 702 may be a moving window, moving while the autonomous vehicle travels a path 701, and thereby may always be a record of how the orientation of the autonomous vehicle 1 has changed over a most recent distance, as part of the distance window 702. The path 701 may be the pre-defined path 30 or a virtual track as part of the predefined path 30.

Figure 8:
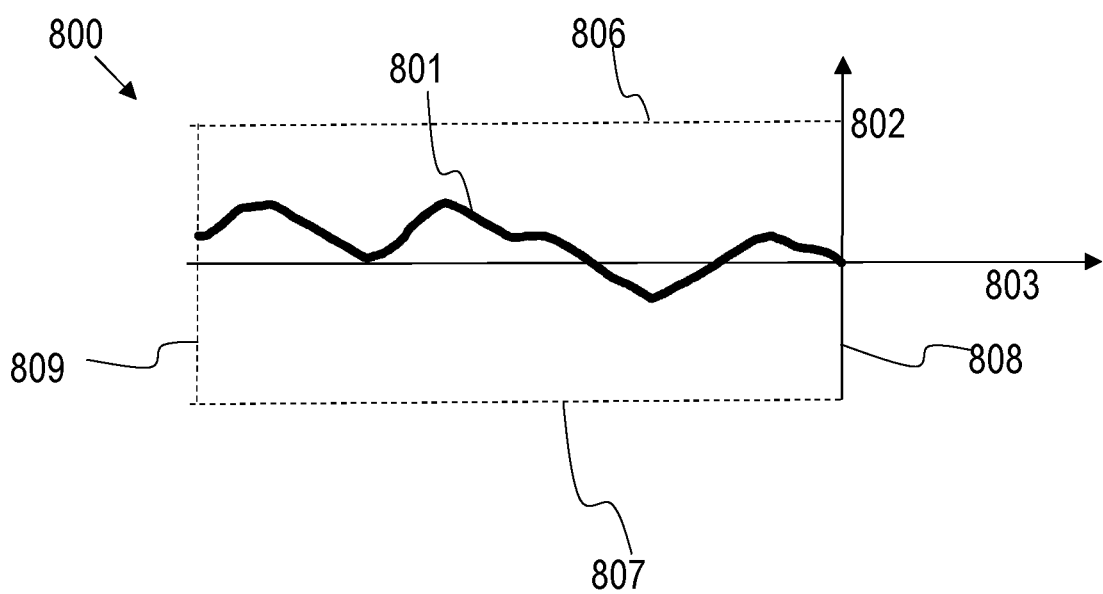
FIG. 8 is a schematic diagram illustrating a distance window according to embodiments herein.

Another example of a distance window 800 is illustrated in FIG. 8. A line 801 illustrates a cumulative sum of distance and/or angular orientation changes over the distance window 800. Y-axis 802 indicates angular orientation or change in angular orientation. X-axis 803 indicates a distance travelled by the autonomous vehicle 1. The distance window 800 is demarcated with a dashed vertical line 809, indicating the length of the distance window 800 in relation to a current position 808. Dashed horizontal lines 806, 807 indicates a threshold for which, if the line 801 exceeds, then the autonomous vehicle 1 has turned around in the distance window 800, and it can be assumed that the vehicle 1 has turned towards the first work area 10, e.g., as part of action 203. In other words, an effect of the mechanism may be that a speed restriction will be triggered if the line 801 does not completely lie between the two dashed lines, representing an angular change threshold, e.g., as in action 203 above.

In some embodiments, it may be proven that the procedures above, using a distance window, may prevent the autonomous vehicle 1 from turning around undetected if parameters are selected according to Equation 1 above, and/or:

> An angular threshold=180–2\*a [degrees]; and

> A Length of recorded history in a distance window>=$(d-(1-\cos(a))r)/\sin(a)$.

Figure 9:
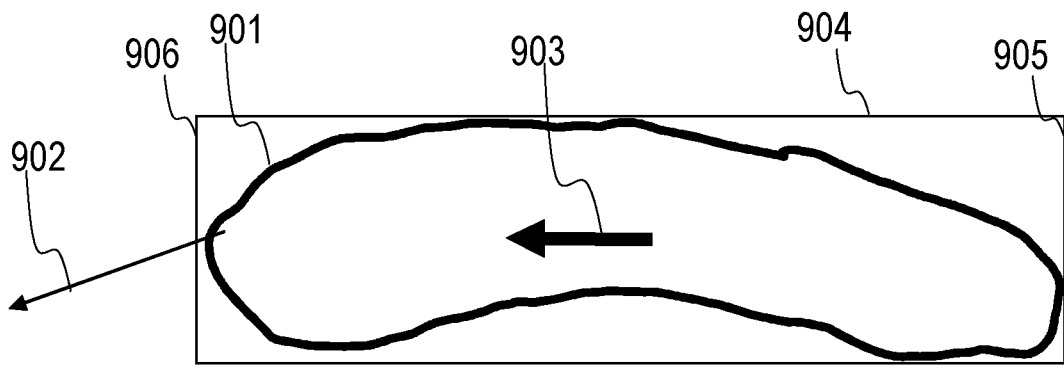
FIG. 9 is a schematic diagram illustrating an example scenario according to embodiments herein.

In these embodiments, r may be a minimal turning radius, e.g., the smallest radius possible for the autonomous vehicle 1 to use when turning around in a selected area of interest. A selected area of interest is exemplified in FIG. 9 as an area 901. The area 901 may be a loading zone or other larger area where the autonomous vehicle 1 can turn around easily, e.g., as part of the first work area 10 and/or a part of the predefined path 30, such as a widest or largest part of the predefined path 30. The parameter d as mentioned above with respect to FIG. 8 may be a distance between sides 905, 906 of the area 901 that align with a set direction of travel 903 of a bounding rectangle 904 that subsumes the area 901. In other words, the length of a distance window of embodiments herein may be bounded by lengths between two sides of a bounding rectangle around a largest area of interest where the autonomous vehicle 1 is able to turn around towards the first work area 10. Path 902 may be the predefined path 30 of where the autonomous vehicle 1 is to travel, or a virtual track for the autonomous vehicle 1 to follow.

Using a distance window, and detecting whether or not the autonomous vehicle 1 turns around in said distance window, ensures that the autonomous vehicle 1 will never be able to return to the first work area 10 using the relaxed operational requirements, e.g., a high speed. A basic principle of the argument is that a width of the selected region of interest may be used to restrict the types of "U-turns" that can be performed, and all other turns may be blocked by edges. This allows the distance window to be limited in distance, and a yaw rate can be integrated to capture all U-turns that would make the autonomous vehicle 1 to turn towards the first work area 10.

In embodiments herein, estimation of changes in angular orientation, e.g., change in yaw angle, and/or distance travelled by the autonomous vehicle 1 may be performed by a numerical integration of a yaw-rate and speed measurements obtained since a previous cycle or iteration of measurements in a distance window of embodiments herein. One particular method to use is to perform an integration, e.g., using a Trapezoidal rule.

Handling Uncertainty in Yaw-Rate Measurement

Both the speed and yaw-rate measurements may to some extent be inexact, e.g., due to errors in sensors or unexpected motions of the autonomous vehicle 1. As a logical consequence, their integration will be inexact which means that change in angular orientation may have some inaccuracies which grows larger with the length of the distance window. Since the purpose is to provide a high integrity mechanism for detecting whether the autonomous vehicle 1 turns towards the first work area 10, bounds on the worst-case realizations of the uncertainty may need to be considered, e.g., to provide bounds on an integral. As an example, a worst-case uncertainty of the angular change in orientation of the autonomous vehicle 1 in a distance window, may be bounded by an additive term, e.g., which may be based on various component configurations or characteristics of the autonomous vehicle 1.

For the angular orientation difference, this may be expressed as Equation (2) below:

$$\int_{t_k}^{t_{k+1}} \omega(t) + n(t)\, dt = \int_{t_k}^{t_{k+1}} \omega(t)dt + \int_{t_k}^{t_{k+1}} n(t)\, dt = I(t_k, t_{k+1}) + N(t_k, t_{k+1})$$

In Equation (2), N may be the integration of a yaw-rate noise of the autonomous vehicle 1. k may be one instance of a cycle, and k+1 is the next cycle. Additionally or alternatively, k and k+1 may be any suitable point in time.

$\omega(t)$ may be the angular change in orientation, e.g., yaw angle change.

n(t) may be the uncertainty of yaw rate, e.g., a maximum value.

$I(t_k, t_{k+1})$ may be the integral of yaw rate, i.e. between time k and time k+1.

$N(t_k, t_{k+1})$ may be the integral of uncertainty of yaw rate.

Since the uncertainty may be in either direction (left or right angular orientation change), it can be concluded that the actual angular change of orientation is such that $$\Delta\varphi^{actual}(t) \in [I(0, t) - N(0, t), I(0, t) + N(0, t)]$$

where t is time, e.g., any suitable point in time. I may be the integral of yaw rate, i.e. between time 0 and t. N may be the integral of uncertainty of yaw rate i.e., between time 0 and t.

In other words, embodiments herein may be formulated as from a front position of a distance window, i.e. most recent measurements, incrementally check if a cumulative sum of previous orientation changes plus/minus integration of yaw-rate noise, e.g., estimated uncertainty, exceeds a threshold value, and if true, the autonomous vehicle 1 is considered to have turned around, e.g., towards the first work area 10, and therefore restrict the speed or otherwise make the operational requirements of the autonomous vehicle 1 more strict until the autonomous vehicle 1 is unloaded. Stop checking when the cumulative sum of previous distance travelled changes exceeds a threshold value.

Figure 10:
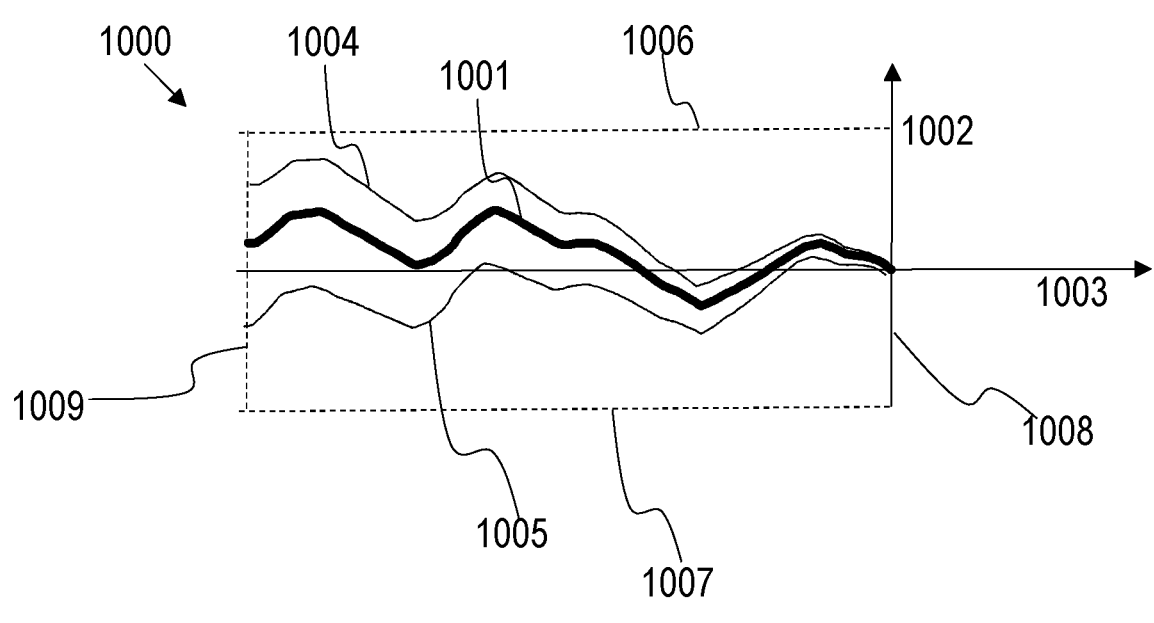
FIG. 10 is a diagram illustrating a distance window according to embodiments herein.

How uncertainty may be handled is illustrated in FIG. 10 by an example of a distance window 1000. A line 1001 illustrates a cumulative sum of distance and/or angular orientation changes over the distance window 1000. Y-axis 1002 indicates angular orientation or change in angular orientation. X-axis 1003 indicates a distance travelled by the autonomous vehicle 1. The distance window 1000 is demarcated with a dashed vertical line 1009, indicating the length of the distance window 1000 in relation to a current position 1008. Uncertainty lines 1004, 1005 indicates the uncertainty of the cumulative sum indicated by line 1001. As it can be seen in FIG. 10, the uncertainty increases as the autonomous vehicle 1 travels. Dashed horizontal lines 1006, 1007 indicates a threshold for which, if the line 1001 and/or any of lines 1004, 1005 exceeds, then the autonomous vehicle 1 may be assumed to have turned around in the distance window 1000. This is since, due to the uncertainty, there is a risk that the autonomous vehicle 1 has turned around, e.g., towards the first work area 10. Using the uncertainty lines 1006, 1007 may be part of detection as part of any example or embodiment in action 203. An effect of the mechanism may be that a speed restriction will be triggered if the lines 1006, 1007 does not completely lie between the two dashed lines, representing an angular change threshold, e.g., as in action 203 above.

In embodiments herein, distance travelled in a distance window may be an estimation from any suitable sensor(s) in the autonomous vehicle 1, e.g., by using speed sensors. Since the sensors used to estimate the speed may also have inaccuracies, an underestimation of the speed may be used. This means that the distance travelled according to the distance window of embodiments herein, may be lower than what is actually travelled by the autonomous vehicle 1.

Figure 11:
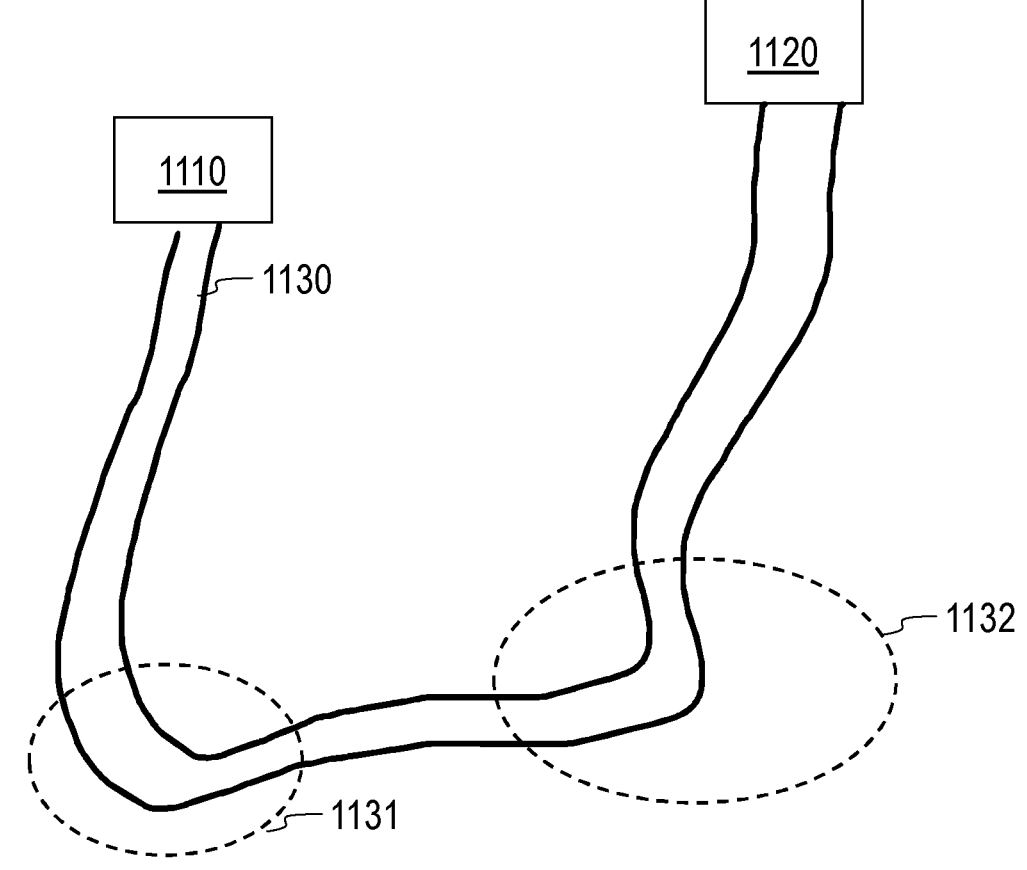
FIG. 11 is a schematic diagram illustrating an example according to embodiments herein.

One advantage of using a distance window is illustrated in FIG. 11. In FIG. 11, the autonomous vehicle 1 may be arranged to drive from a loading area 1110 to an unloading area 1120 using a path 1130. The loading area 1110 may be the first work area 10. The unloading area 1120 may be the second work area 20. The path 1130 may be the predefined path 30. When the length of a distance window is selected based on areas where the autonomous vehicle 1 can turn around, the distance window only needs to cover a certain length, which allows larger U-turns, formed by two non-subsequent turning areas 1131, 1132, to not be detected as that the autonomous vehicle 1 turns towards the loading area 1110. In other words, the distance window can be kept short and efficient, allowing the autonomous vehicle 1 to navigate complex sites, while still detecting dangerous U-turns where the autonomous vehicle 1 may be at risk of travelling towards areas where there may be manual actors operating.

Embodiments herein may be combined with different localization techniques where it is possible to enable and disable the functionality of detecting whether the autonomous vehicle 1 turns, in certain areas. I.e., embodiments herein may be used where localization using other sensors is not suitable, and/or when they have poor stability/accuracy. Such localization could be done in different ways, for example with more general techniques such as Global navigation satellite system (GNSS) or Lidar scan-matching, or with simpler solutions, for example using anchor points such as Radio Frequency Identifier (RFID) tags in strategic locations of the predefined path 30.

Another solution, combinable with embodiments herein may be to utilize a distance travelled by the autonomous vehicle 1 since a certain action of the autonomous vehicle 1, e.g., as part of detection in action 201. For example, embodiments herein may be enabled when the autonomous vehicle 1 becomes loaded, and/or when the autonomous vehicle 1 has driven at least X meters or for Y amount of time at a certain speed.

To perform the method actions described herein, the control unit 70 may be configured to perform any one or more of the above actions 201-206 or any of the other examples, actions, and/or embodiments herein. The control unit 70 may for example comprise an arrangement depicted in FIGS. 12a, and 12b.

The control unit 70 may comprise an input and output interface 1200 configured to communicate with any necessary components or entities of embodiments herein. The input and output interface 1200 may comprise a wireless and/or wired receiver (not shown) and a wireless and/or wired transmitter (not shown). The control unit 70 may be arranged in any suitable location of the autonomous vehicle 1. The control unit 70 may use the input and output interface 1200 to control and communicate with sensors, actuators, subsystems, and interfaces in the autonomous vehicle 1 by using any one or more out of: Controller Area Network (CAN), ethernet cables, Wi-Fi, Bluetooth, and/or other network interfaces.

The control unit 70 may be configured to, e.g. by means of a detecting unit 1201 in the control unit 70, detect that the autonomous vehicle 1 is initiating driving in the predefined path 30.

The control unit 70 may be configured to, e.g. by means of a triggering unit 1202 in the control unit 70, when detected that the autonomous vehicle 1 is initiating driving in the predefined path 30, trigger a relaxation of the operational requirements.

The control unit 70 may be configured to, e.g. by means of the detecting unit 1201 in the control unit 70, when the autonomous vehicle 1 is driving in the predefined path 30, detect whether the autonomous vehicle 1 turns towards the first work area 10.

The control unit 70 may be configured to, e.g. by means of the triggering unit 1202 in the control unit 70, when detecting that the autonomous vehicle 1 turns towards the first work area 10, trigger a preventive action for preventing the autonomous vehicle 1 from driving towards the first work area 10 using the relaxed operational requirements.

The control unit 70 may be configured to, e.g. by means of a measuring unit 1203 in the control unit 70, measure a distance and/or time driven in the predefined path 30.

The control unit 70 may be configured to, e.g. by means of the triggering unit 1202 in the control unit 70, when the measured distance and/or time driven in the predefined path 30 fulfil at least one predetermined condition, trigger an increase of the operational requirements.

The control unit 70 may be configured to, e.g. by means of a maintaining unit 1204 in the control unit 70, maintain the relaxed operational requirements until detecting that the autonomous vehicle 1 turns towards the first work area 10, e.g., while the autonomous vehicle 1 is loaded.

The control unit 70 may be configured to, e.g., by means of an establishing unit 1205 in the control unit 70, establish an angular change in orientation of the autonomous vehicle 1 over a distance window by estimating a change in yaw angle and a change in distance travelled by the autonomous vehicle 1.

Figure 12A:
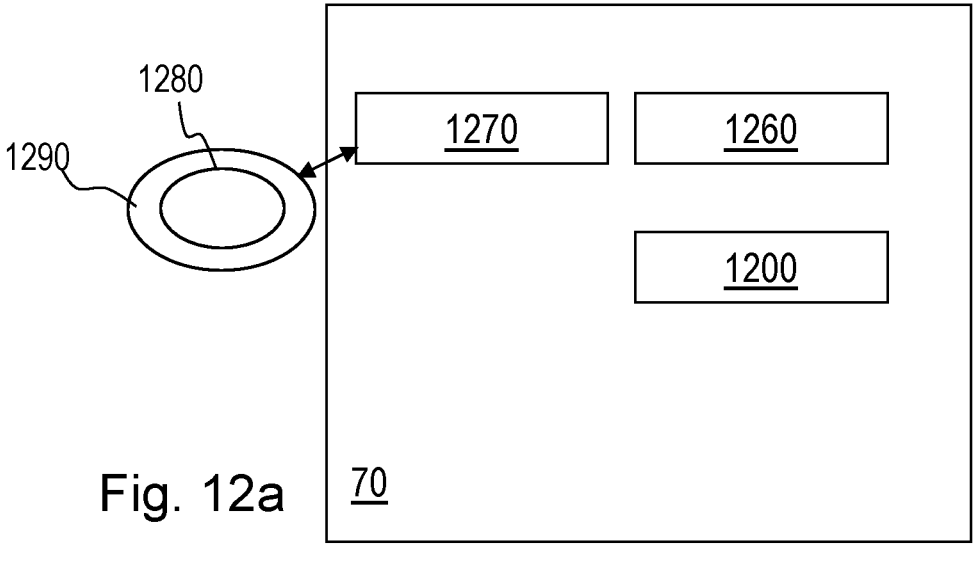
FIGS. 12*a*-12*b* are schematic block diagrams illustrating a control unit according to embodiments herein.
Figure 12B:
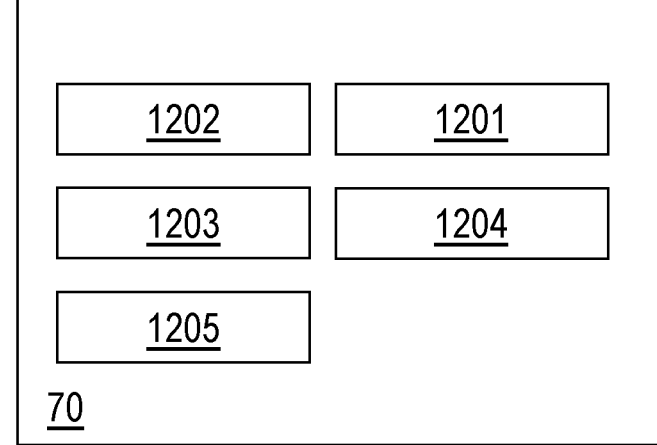

The embodiments herein may be implemented through a processor or one or more processors, such as the processor 1260 of a processing circuitry in the control unit 70 depicted in FIG. 12a, together with computer program code for performing the functions and actions of the embodiments herein. The program code mentioned above may also be provided as a computer program medium, for instance in the form of a data computer readable medium carrying computer program code for performing the embodiments herein when being loaded into the control unit 70. One such computer readable medium may be in the form of a memory stick. The computer program code may furthermore be provided as pure program code on a server and downloaded to the control unit 70.

The control unit 70 may further comprise a memory 1270 comprising one or more memory units. The memory 1270 comprises instructions executable by the processor in control unit 70. The memory 1270 is arranged to be used to store e.g. information, indications, data, configurations, operational requirements, information of the predefined path, and applications to perform the methods herein when being executed in the control unit 70.

In some embodiments, a computer program 1280 comprises instructions, which when executed by a computer, e.g. the at least one processor 1260, cause the at least one processor of the control unit 70 e.g., to perform the actions 201-206 above.

In some embodiments, a computer-readable storage medium 1290 comprises the respective computer program 1280. The computer-readable storage medium 1290 may comprise program code for performing the steps of e.g., any one of actions 201-206 above when said program product is run on a computer, e.g. the at least one processor 1260.

Those skilled in the art will appreciate that the units in the control unit 70 described above may refer to a combination of analogue and digital circuits, and/or one or more processors configured with software and/or firmware, e.g. stored in the control unit 70, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

It is to be understood that the present invention is not limited to the embodiments described above and illustrated in the drawings; rather, the skilled person will recognize that many changes and modifications may be made within the scope of the appended claims.

The invention claimed is:

1. A method for handling operational requirements for an autonomous vehicle driving from a first work area to a second work area via a predefined path and wherein the operations of the autonomous vehicle are constrained by the operational requirements, the method comprising:
   detecting that the autonomous vehicle is initiating driving in the predefined path,
   when detected that the autonomous vehicle is initiating driving in the predefined path, triggering a relaxation in the operational requirements,
   when the autonomous vehicle is driving in the predefined path, detecting whether the autonomous vehicle turns towards the first work area,
   when detecting that the autonomous vehicle turns towards the first work area, triggering a preventive action for preventing the autonomous vehicle from driving towards the first work area using the relaxed operational requirements, wherein triggering the preventive action comprises triggering an increase of the operational requirements.

2. The method according to claim 1, further comprising:
   maintaining the relaxed operational requirements until detecting that the autonomous vehicle turns towards the first work area.

3. The method according to claim 2, wherein maintaining the relaxed operational requirements until detecting that the autonomous vehicle turns towards the first work area comprises maintaining the relaxed operational requirements until detecting that the autonomous vehicle turns towards the first work area while the autonomous vehicle is loaded.

4. The method according to claim 1, further comprising:
   measuring a distance and/or time driven in the predefined path, and when the measured distance and/or time driven in the predefined path fulfil at least one predetermined condition, triggering an increase of the operational requirements.

5. The method according to claim 4, wherein the at least one predetermined condition is fulfilled when the measured distance is above a predefined distance threshold.

6. The method according to claim 4, wherein the at least one predetermined condition is fulfilled when the measured time multiplied with a predetermined max speed of the predefined path is above the predefined distance threshold.

7. The method according to claim 4, wherein triggering the increase of the operational requirements comprises resetting the operational requirements.

8. The method according to claim 4, wherein triggering the increase of the operational requirements comprises any one or more out:
   decreasing a maximum speed limit of the autonomous vehicle,
   adjusting one or more sensors and/or subsystems of the autonomous vehicle.

9. The method according to claim 1, wherein detecting whether the autonomous vehicle turns towards the first work area comprises estimating a risk that the autonomous vehicle has turned towards the first work area, and detecting that the autonomous vehicle has turned towards the first work area when the risk exceeds a threshold.

10. The method according to claim 1, wherein detecting that the autonomous vehicle is initiating driving in the predefined path comprises determining that the autonomous vehicle is positioned in the first work area and that a driving direction of the vehicle is directed along the predefined path.

11. The method according to claim 1, wherein detecting that the autonomous vehicle is initiating driving in the predefined path comprises detecting that the autonomous vehicle loaded.

12. The method according to claim 1, wherein detecting that the autonomous vehicle is initiating driving in the predefined path comprises receiving a signal indicating that the autonomous vehicle is initiating driving in the predefined path.

13. The method according to claim 12, wherein the signal is received from a wireless device or stationary control device in the first work area, which wireless device or stationary control device is operated by a user in the first work area, or wherein the signal is derived from obtained measurements related to an operational status of the autonomous vehicle.

14. The method according to claim 1, wherein the operational requirements comprise one or more safety constraints imposed on operations of the autonomous vehicle for hindering a collision between the autonomous vehicle and manual actors.

15. The method according to claim 1, wherein triggering the relaxation of the operational requirements comprises any one or more out of:
   increasing a maximum speed limit of the autonomous vehicle, adjusting one or more sensors and/or subsystems of the autonomous vehicle.

16. The method according to claim 15, wherein adjusting the one or more sensors and/or subsystems comprises any one or more out of:

adjusting or switching a brake system of the autonomous vehicle, and disabling and/or switching an obstacle detection system of the autonomous vehicle.

17. The method according to claim 1, wherein detecting whether the autonomous vehicle turns towards the first work area comprises:

estimating a turning radius of the autonomous vehicle, and comparing the estimated turning radius with a predefined width of the predefined path.

18. The method according to claim 17, wherein the autonomous vehicle is detected to turn towards the first work area when $2R-K \leq W$, wherein R is the estimated turning radius of the autonomous vehicle, K is a preconfigured margin constant, and wherein W is the predefined width of the predefined path.

19. The method according to claim 17, wherein estimating the turning radius and/or measuring the aggregated turning angle comprises: based on a current vehicle speed or a wheel speed profile, determining one or more turning parameters for a predetermined future time period.

20. The method according claim 19, wherein the turning parameters comprise any one or more out of: a yaw rate, a steering wheel angle, and a lateral acceleration of the autonomous vehicle.

21. The method according to claim 17, wherein estimating the turning radius and/or measuring the aggregated turning angle comprises determining a turning path for the autonomous vehicle.

22. The method according to claim 1, wherein detecting whether the autonomous vehicle turns towards the first work area comprises:

estimating an average turning radius of the autonomous vehicle for a predetermined past time period, and comparing the estimated turning radius with a predetermined maximum allowed average turning radius for the predetermined past time period.

23. The method according to claim 1, wherein detecting whether the autonomous vehicle turns towards the first work area comprises:

measuring an aggregated turning angle of the autonomous vehicle, wherein the aggregated turning angle indicates a total angle turned by the autonomous vehicle when driving in the predefined path, and comparing the aggregated turning angle with a predetermined maximum allowed steering wheel angle of the autonomous vehicle.

24. The method according to claim 1, wherein detecting whether the autonomous vehicle turns towards the first work area, comprises obtaining an angular change in orientation of the autonomous vehicle over a distance window defining a distance travelled by the autonomous vehicle, and detecting that the autonomous vehicle turns towards the first work area when the angular change in orientation exceeds a threshold.

25. The method according to claim 24, wherein the method further comprises establishing the angular change in orientation of the autonomous vehicle over the distance window by estimating a change in yaw angle and a change in distance travelled by the autonomous vehicle.

26. The method according to claim 25, wherein estimating the change in yaw angle and change in distance travelled by the autonomous vehicle is performed periodically when the autonomous vehicle is travelling in the predefined path.

27. The method according to claim 25, wherein the angular change in orientation of the autonomous vehicle over the distance window is a cumulative sum of a plurality of yaw angles measured by the autonomous vehicle over the distance travelled by the autonomous vehicle.

28. The method according to claim 25, wherein the distance window is a distance of a set length, which distance is the most recent distance travelled by the autonomous vehicle in the predefined path.

29. The method according to claim 28, wherein the set length of the distance window is limited by a minimal turning radius of the autonomous vehicle and/or by a size, e.g., a width, of the predefined path and/or the first work area.

30. The method according to claim 25, wherein obtaining the angular change in orientation of the autonomous vehicle over the distance window comprises obtaining an uncertainty of the obtained angular change in orientation of the autonomous vehicle, and wherein detecting that the autonomous vehicle turns towards the first work area is further based on the obtained uncertainty.

31. A control unit configured to perform the method according to claim 1.

32. An autonomous vehicle comprising a control unit according to claim 31, the autonomous vehicle being configured to drive from a first work area to a second work area via a predefined path.

33. The autonomous vehicle according to claim 32, wherein the autonomous vehicle is further configured with a predetermined maximum allowed steering wheel angle.

34. A computer program comprising program code means for performing the steps of claim 1 when said program is run on a computer.

35. A computer program medium carrying a computer program comprising program code means for performing the steps of claim 1 when said program is run on a computer.

* * * * *